United States Patent
Wang et al.

(10) Patent No.: US 10,809,400 B2
(45) Date of Patent: Oct. 20, 2020

(54) DETERMINING SHEAR SLOWNESS BASED ON A HIGHER ORDER FORMATION FLEXURAL ACOUSTIC MODE

(71) Applicant: Schlumberger Technology Corporation, Sugar Land, TX (US)

(72) Inventors: Pu Wang, Arlington, MA (US); Sandip Bose, Cambridge, MA (US); Bikash Sinha, Cambridge, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 45 days.

(21) Appl. No.: 15/331,958

(22) Filed: Oct. 24, 2016

(65) Prior Publication Data

US 2017/0115414 A1    Apr. 27, 2017

Related U.S. Application Data

(60) Provisional application No. 62/247,178, filed on Oct. 27, 2015.

(51) Int. Cl.
| | | |
|---|---|---|
| *G01V 3/38* | (2006.01) | |
| *G01V 1/30* | (2006.01) | |
| *G01V 1/50* | (2006.01) | |
| *G01V 1/28* | (2006.01) | |

(52) U.S. Cl.
CPC ............. *G01V 1/306* (2013.01); *G01V 1/284* (2013.01); *G01V 1/303* (2013.01); *G01V 1/50* (2013.01); *G01V 2200/16* (2013.01); *G01V 2210/42* (2013.01); *G01V 2210/43* (2013.01); *G01V 2210/47* (2013.01); *G01V 2210/626* (2013.01); *G01V 2210/6222* (2013.01)

(58) Field of Classification Search
CPC ........ G01V 1/306; G01V 1/284; G01V 1/303; G01V 1/50; G01V 2200/16
USPC .............................................................. 702/9
See application file for complete search history.

(56) References Cited

U.S. PATENT DOCUMENTS

| | | | | |
|---|---|---|---|---|
| 4,888,740 | A * | 12/1989 | Brie ........................ | G01V 1/50 181/102 |
| 5,077,697 | A * | 12/1991 | Chang ..................... | G01V 1/005 367/31 |
| 5,587,966 | A | 12/1996 | Kimball et al. | |
| 6,449,560 | B1 | 9/2002 | Kimball | |
| 6,614,716 | B2 * | 9/2003 | Plona ....................... | G01V 1/48 166/250.01 |

(Continued)

OTHER PUBLICATIONS

Sinha et al., "Influence of a pipe tool on borehole modes", Geophysics, vol. 74(3), May-Jun. 2009.

(Continued)

*Primary Examiner* — Toan M Le
*Assistant Examiner* — Xiuqin Sun

(57) ABSTRACT

A technique includes receiving data acquired by an acoustic measurement tool in a well, where the data represents multiple acoustic modes, including a first order formation flexural acoustic mode and a higher order formation flexural acoustic mode. The technique includes processing the data to identify the higher order formation flexural acoustic mode; and determining a shear slowness based at least in part on slowness values that are associated with the identified higher order formation flexural acoustic mode.

19 Claims, 16 Drawing Sheets

(56) References Cited

U.S. PATENT DOCUMENTS

| | | | |
|---|---|---|---|
| 6,718,266 B1 | 4/2004 | Sinha et al. | |
| 6,957,572 B1* | 10/2005 | Wu | G01V 1/50 |
| | | | 73/152.16 |
| 7,643,374 B2* | 1/2010 | Plona | G01V 1/34 |
| | | | 367/68 |
| 7,649,805 B2 | 1/2010 | Bose et al. | |
| 7,652,950 B2 | 1/2010 | Sinha et al. | |
| 7,830,744 B2 | 11/2010 | Wu et al. | |
| 8,102,732 B2 | 1/2012 | Pabon et al. | |
| 8,339,897 B2 | 12/2012 | Shuchin et al. | |
| 9,086,508 B2 | 7/2015 | Sinha et al. | |
| 9,334,718 B2 | 5/2016 | Valero et al. | |
| 2005/0254343 A1 | 11/2005 | Saiki et al. | |
| 2006/0256655 A1 | 11/2006 | Sinha et al. | |
| 2006/0285437 A1 | 12/2006 | Sinha et al. | |
| 2009/0010104 A1 | 1/2009 | Leaney | |
| 2009/0070042 A1 | 3/2009 | Birchwood et al. | |
| 2010/0085835 A1 | 4/2010 | Tang et al. | |
| 2010/0106440 A1* | 4/2010 | Richmond | G01S 3/74 |
| | | | 702/71 |
| 2010/0157731 A1 | 6/2010 | Aeron et al. | |
| 2011/0026730 A1* | 2/2011 | Li | H04R 3/005 |
| | | | 381/92 |
| 2011/0058451 A1 | 3/2011 | Yoneshima | |
| 2012/0287754 A1 | 11/2012 | Johnson | |
| 2013/0044568 A1 | 2/2013 | Curry | |
| 2014/0365133 A1 | 12/2014 | Elkington et al. | |
| 2015/0029823 A1 | 1/2015 | Yang et al. | |
| 2015/0117151 A1 | 4/2015 | Curry et al. | |
| 2016/0209538 A1 | 7/2016 | Wang et al. | |
| 2016/0291185 A1 | 10/2016 | Wang et al. | |
| 2018/0010443 A1 | 1/2018 | Lu et al. | |
| 2018/0196156 A1 | 7/2018 | Assous et al. | |
| 2019/0025452 A1 | 1/2019 | Wang et al. | |
| 2019/0129053 A1 | 5/2019 | Wang et al. | |

OTHER PUBLICATIONS

Aeron et al., "Automatic dispersion extraction using continuous wavelet transform", in proceedings of the International Conference on Acoustics, Speech, and Signal Processing, Las Vegas, NV, 2008.

Lang et al., "Estimating slowness dispersion from arrays of sonic logging waveforms," Geophysics, vol. 52, No. 4, pp. 530-544, Apr. 1987.

Elkstrom, M.P., "Dispersion estimation from borehole acoustic arrays using a modified matrix pencil algorithm," in Proc. 29th Asilomar Conf. Signals, Syst., Comput., vol. 2, Pacific Grove, CA, Nov. 1995, pp. 449-453.

Hsu et al., "Parametric estimation of phase and group slowness from sonic logging waveforms," Geophysics, vol. 57, No. 8, pp. 978-985, Aug. 1992.

Areon et al., "Broadband dispersion extraction using simultaneous sparse penalization," IEEE Trans, on Signal Process., vol. 59, No. 10, pp. 4821-4837, Oct. 2011.

Wang et al., Broadband dispersion extraction of borehole acoustic modes via sparse Bayesian learning, in proceedings of the IEEE 5th International Workshop on Computational Advances in Multi-Sensor Adaptive Processing, Saint Martine, 2013.

Plona et al., "Slowness-frequency projection logs: a new QC method for accurate sonic slowness evaluation", in proceedings of the SPWLA 46th Annual Logging Symposium, Jun. 2005.

Wang et al., "Cramer-Rao bounds for broadband dispersion extraction of borehole acoustic modes", IEEE Signal Processing Letters vol. 21, No. 9, May 2014.

Braunisch et al., "Inversion of borehole dispersions for formation elastic moduli" in proceedings of 2000 IEEE International Ultrasonics Symposium, Puerto Rico, Oct. 2000.

Braunisch et al., "Inversion of guided-wave dispersion data with application to borehole acoustics,"J Acoust. Soc. Am., vol. 115( I), pp. 269-279, Jan. 2004.

Yang et al., "Estimation of formation shear and borehole fluid slownesses in the presence of a drill collar" the 2011 Annual SEG Meeting, San Antonio, TX, 2011.

Yang et al., Estimation of formation shear and borehole-fluid slownesses using sonic dispersion data in well-bonded cased boreholes, Geophysics, vol. 76(6), Nov.-Dec. 2011.

Tang et al., "A curve-fitting method for analyzing dispersion characteristics of guided elastic waves", SEG International Exposition and Annual Meeting, 2009.

Long, X., "Frequency Smoothed Robust Capon Beamformer Applied to Medical Ultrasound Imaging", A Thesis Submitted for the Degree of Master of Philosophy a the Australian National University (Jul. 2014) (Year: 2014), 92 pages.

Office Action issued in U.S. Appl. No. 15/331,946 dated Mar. 5, 2020, 27 pages.

* cited by examiner

DETERMINING SHEAR SLOWNESS BASED ON A HIGHER ORDER FORMATION FLEXURAL ACOUSTIC MODE

RELATED APPLICATIONS

This application claims the benefit pursuant to 35 U.S.C. § 119(e) to U.S. Provisional Patent Application Ser. No. 62/247,178, to Pu Wang et. al., entitled, "A MODEL-INDEPENDENT WORKFLOW FOR LOGGING WHILE DRILLING DIPOLE SHEAR LOGGING IN FAST FORMATIONS," which was filed on Oct. 27, 2015, and is hereby incorporated by reference in its entirety.

BACKGROUND

Hydrocarbon fluids, such as oil and natural gas, are obtained from a subterranean geologic formation, referred to as a reservoir, by drilling a well that penetrates the hydrocarbon-bearing formation. During drilling and at other stages of exploration through production, various downhole tools may be used to acquire data for purpose of evaluating, analyzing, and monitoring the well bore and the surrounding geological strata. In some cases, the acquired data includes sonic or seismic data, i.e., data acquired by sensors, or receivers, in response to sonic/seismic energy interacting with the wellbore and the surrounding geological strata. The acquired data may be processed and interpreted for purposes of deriving information regarding the hydrocarbon-bearing formation, the well and other aspects pertaining to subterranean exploration.

SUMMARY

In an example implementation, a technique includes receiving data acquired by an acoustic measurement tool in a well, where the data represents multiple acoustic modes, including a first order formation flexural acoustic mode and a higher order formation flexural acoustic mode. The technique includes processing the data to identify the higher order formation flexural acoustic mode; and determining a shear slowness based at least in part on slowness values that are associated with the identified higher order formation flexural acoustic mode.

In another example implementation, an apparatus includes an interface and a processor. The interface receives data representing measurements acquired by a logging while drilling (LWD) acoustic measurement tool in a well in response to energy that is emitted by a dipole source of the tool. The data represents multiple acoustic modes, including a first order formation flexural acoustic mode and a higher order formation flexural acoustic mode. The processor processes the data to identify the higher order formation flexural acoustic mode and determines a shear slowness based at least in part on slowness values that are associated with the identified higher order formation flexural acoustic mode.

In yet another example implementation, an article includes a non-transitory computer readable storage medium to store instructions that when executed by a computer cause the computer to receive data acquired by an acoustic measurement tool in a well, where the data represents multiple acoustic modes, including a first order formation flexural acoustic mode and a higher order formation flexural acoustic mode. The instructions when executed by the computer cause the computer to process the data to identify the higher order formation flexural acoustic mode and determine a shear slowness based at least in part on slowness values that are associated with the identified higher order formation flexural acoustic mode.

Advantages and other features will become apparent from the following description, drawings and claims.

DETAILED DESCRIPTION

Figure 1:
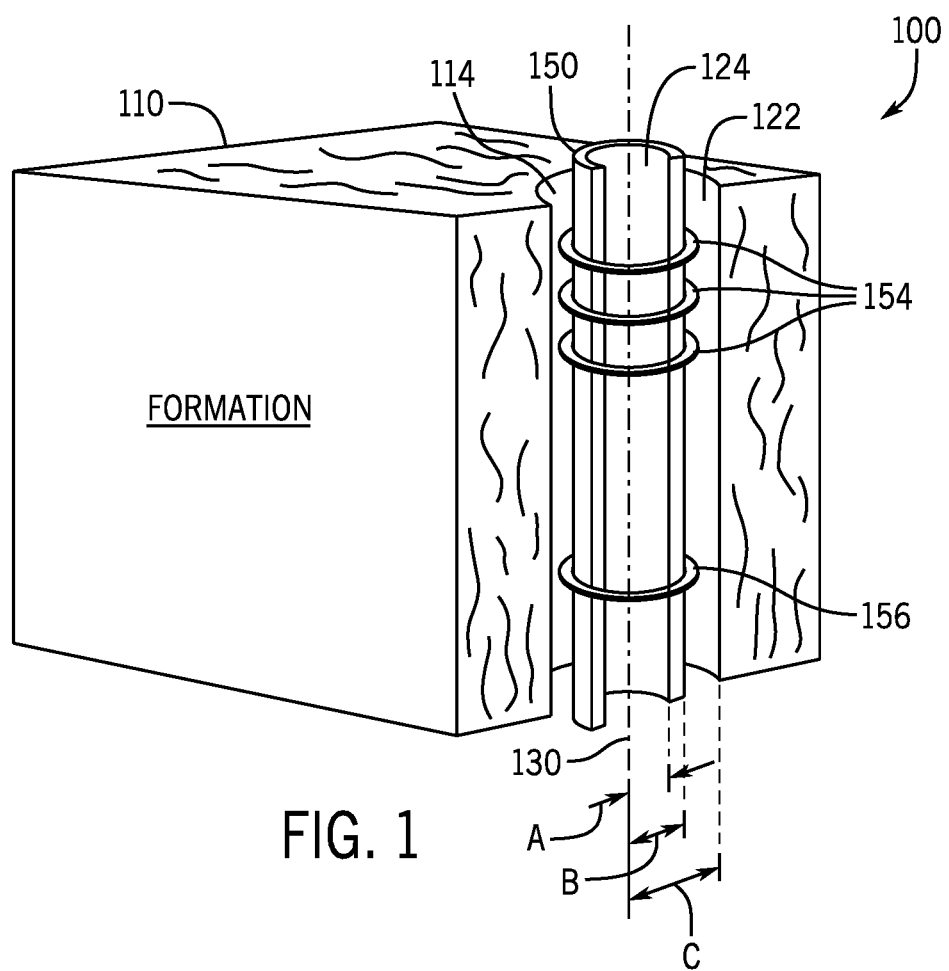
FIG. 1 is an illustration of an acoustic measurement tool in a wellbore according to an example implementation.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

As used throughout the specification and claims, the term "downhole" refers to a subterranean environment, particularly in a well or wellbore. "Downhole tool" is used broadly to mean any tool used in a subterranean environment including, but not limited to, a logging tool, an imaging tool, an acoustic tool, a permanent monitoring tool, and a combination tool.

The various techniques disclosed herein may be utilized to facilitate and improve data acquisition and analysis in downhole tools and systems. In this, downhole tools and systems are provided that utilize arrays of sensing devices that are configured or designed for easy attachment and detachment in downhole sensor tools or modules that are deployed for purposes of sensing data relating to environmental and tool parameters downhole, within a borehole. The tools and sensing systems disclosed herein may effectively sense and store characteristics relating to components of downhole tools as well as formation parameters at elevated temperatures and pressures. Chemicals and chemical properties of interest in oilfield exploration and development may also be measured and stored by the sensing systems contemplated by the present disclosure. The sensing systems herein may be incorporated in tool systems such as wireline logging tools, measurement-while-drilling and logging-while-drilling tools, permanent monitoring systems, drill bits, drill collars, sondes, among others. For purposes of this disclosure, when any one of the terms wireline, cable line, slickline or coiled tubing or conveyance is used it is understood that any of the referenced deployment means, or any other suitable equivalent means, may be used with the present disclosure without departing from the spirit and scope of the present disclosure.

Moreover, inventive aspects lie in less than all features of a single disclosed embodiment. Thus, the claims following the Detailed Description are hereby expressly incorporated into this Detailed Description, with each claim standing on its own as a separate embodiment.

Borehole acoustic logging is a major part of subsurface formation evaluation that is key to oil and gas exploration and production. The logging may be achieved using an acoustic measurement tool, which includes one or multiple acoustic transducers, or sources, and one or multiple sensors, or receivers. The acoustic measurement tool may be deployed in a fluid-field wellbore for purposes of exciting and recording acoustic waveforms. The receivers thus, may acquire data representing acoustic energy that results from the acoustic energy that is emitted by the acoustic sources of the acoustic measurement tool.

The acoustic propagation in the borehole is affected by the properties of rocks surrounding the wellbore. More specifically, the fluid-filled borehole supports propagation of certain number of borehole guided modes that are generated by energy from a source that is placed inside the borehole fluid. These borehole acoustic modes are characterized by their acoustic slowness (i.e., reciprocal of velocity) dispersions, which contain valuable information about the rock mechanical properties. Therefore, the acoustic logging may provide answers pertaining to such diverse applications as geophysical calibration of seismic imaging, geomechanical assessment of wellbore stability, and stress characterization for fracture stimulation. In the context of this application, "acoustic energy" refers to energy in the sonic frequency spectrum, and may be, as example, energy between 200 Hertz (Hz) and 30 kiloHertz (kHz).

In general, the energy that is emitted by the sources of the acoustic measurement tool may travel through rock formations as either body waves or borehole guided waves (that include "flexural waves" described herein). The body waves also include compressional waves, or P-waves, which are waves in which small particle vibrations occur in the same direction as the direction in which the wave is traveling. The body waves may also include shear waves, or S-waves, which are waves in which particle motion occurs in a direction that is perpendicular to the direction of wave propagation. The borehole guided waves may include borehole flexural waves, which can be described by reflections of the acoustic source waves reverberating in the borehole. Another example of borehole guided mode are axi-symmetric Stoneley waves that can also be processed to determine the formation shear slowness. As described herein, the flexural waves may also include waves that propagate along the acoustic measurement tool.

The acoustic measurement tool may include multiple acoustic sources that are associated with multiple source classifications, or categories. For example, the acoustic measurement tool may include one or multiple monopole sources. In response to energy from a monopole sonic source, the receivers of the acoustic measurement tool may acquire data representing energy attributable to various wave modes, such as data representing P-waves, S-waves and Stoneley waves.

The acoustic measurement tool may also include one or multiple directional sources, such as dipole or quadrupole sources, which produce flexural or additional borehole guided waves, which travel through the fluid in the borehole and along the tool itself. Data representing these flexural or borehole guided waves may be processed for such purposes as determining the presence or absence of azimuthal anisotropy. For example implementations that are described herein, the data representing the flexural waves is processed for purposes of determining a shear slowness.

The speeds at which the aforementioned waves travel are affected by various properties of the downhole environment, such as the rock mechanical properties, density and elastic dynamic constants, the amount and type of fluid present in the formation, the makeup of rock grains, the degree of inter-grain cementation and so forth. Therefore, by measuring the speed of acoustic wave propagation in the borehole, it is possible to characterize the surrounding formations based on sensed parameters relating to these properties. The speed, or velocity of a given sonic wave, or waveform, may be expressed in terms of the inverse of its velocity, which is referred to herein as the "slowness." In this context, an "acoustic wave" or "acoustic waveform" may refer to a particular time segment of energy recorded by one or multiple receivers and may correspond to a particular acoustic waveform mode, such as a body wave mode or flexural wave mode.

Certain acoustic waves are non-dispersive, or do not significantly vary with respect to frequency. Other acoustic waves, however, are dispersive, meaning that the waves vary as a function of frequency.

The acoustic measurement tool may be deployed on a number of platforms, such as a logging while drilling (LWD) platform. In other words, an LWD acoustic measurement tool is disposed on a drilling string, or pipe. Recently introduced LWD acoustic measurement tools may provide data from which both compressional and shear slownesses may be determined for purposes of aiding engineers to drill with greater confidence, determine optimal directions for drilling and identify rocks with better completion characteristics. Particularly, data acquired by an LWD acoustic measurement tool has been particularly used to determine monopole source-derived compressional and shear slownesses for fast formations and quadrupole source-derived shear slowness mostly for slow formations.

In this context, a "fast formation" refers to a formation in which the shear wave velocity is greater than the compressional velocity of the borehole fluid (or "drilling mud"). Otherwise, the formation is a "slow formation."

In general, the shear slownesses for both the fast and slow formations have not been determined from acoustic measurements of energy emitted using a dipole source. Although shear slowness may theoretically be determined from the dipole formation flexural signal, one of the challenges associated with such an approach is that the dipole formation flexural signal is to be extracted from the relatively strongly interfering dipole collar flexural signal. For safe drilling operation, an LWD acoustic measurement tool may include a steel drill collar, and the collar may have a strength as strong as the drill string. As a result, the acoustic waves from the dipole source propagate directly through the drill collar, and their wave amplitudes at the receivers are stronger than the formation signal that probes the formation's elastic properties.

Another challenge with determining shear slowness from dipole formation flexural signal data is that the acquired data quality may be overwhelmed by the drilling noise and vibration. Evidently, the downhole drilling environment creates more inhospitable conditions for the LWD-based acoustic measurement tool than the counterpart wireline-based tool. For example, the drill bit grinds through layers of rock as the rotating drill string and bottom-hole assembly (BHA) continually slam against the borehole wall, thereby vibrating sensitive electronic components of the acoustic measurement tool. Moreover, drilling mud surges through the central passageway of the drill string, exits through the drill bit at the end of the drill string, and brings cuttings to the Earth surface, all elevating the noise level.

Yet another challenge with determining shear slowness from formation dipole flexural signal data arises from the presence of a steel drill collar, which calls for a customized model-based inversion that explicitly takes into account its presence for accurate estimation of the shear slowness. Finally, due to the fast rotation of the drill collar, challenges may arise in centering the LWD acoustic measurement tool in the borehole center, especially during deviated/horizontal drilling because of gravitational pull.

In accordance with example implementations that are described herein, shear slownesses for both the slow and fast formations may be determined, or estimated, from a higher order formation flexural acoustic mode (a third order formation flexural acoustic mode, for example). In particular, a shear slowness may be estimated, or determined, from a higher-order formation flexural acoustic mode in a high frequency region that is uncoupled from the dominant tool flexural acoustic mode.

More specifically, as described herein, due to the discovery that the higher order formation flexural acoustic mode occurs in both isotropic and anisotropic formations, both coherent and non-coherent-based signal processing techniques may be used to identify the presence of this relatively weak acoustic mode and determine a shear slowness ($DT_S$) from slowness values associated within a selected frequency range of the mode.

Referring to FIG. 1, for a given downhole environment 100, an acoustic measurement tool 150 may be modeled as a simple pipe tool in a fluid-filled borehole 114, which extends in a geologic formation 110. Although a vertical section of the borehole 114 is depicted in FIG. 1, the borehole 114 may also have one or multiple horizontally or laterally extending sections. The acoustic measurement tool 150 may be, for example, a LWD-based acoustic measurement tool, which is deployed downhole on a drill string, or pipe. However, other conveyance mechanisms may be used to deploy the tool 150 in accordance with further implementations, such as a wireline, for example. The acoustic measurement tool 150 is surrounded by liquid in the central passageway 124 of the acoustic measurement tool 150, as well as liquid in an annulus 122 between the outside of the acoustic measurement tool 150 and the wellbore wall. In FIG. 1, "A" represents the inner radius of acoustic measurement tool 150, as referenced from a central axis 130 of the tool 150. Moreover, "B" refers to the outer radius of the acoustic measurement tool 150, and the "C" refers to the borehole radius.

In accordance with example implementations, the acoustic measurement tool 150 includes an acoustic dipole source 156, along with potentially other sources, such as a monopole source, a quadrupole source, one or multiple additional dipole sources, and so forth. Moreover, in accordance with example implementations, the acoustic measurement tool 150 may include one or multiple acoustic sensors, or receivers 154, which acquire data that represents time domain waveforms and which is processed as described herein. The receivers 154 may be arranged in an array of receivers, and in accordance with example implementations, the acoustic measurement tool 150 may include multiple receiver arrays.

In accordance with example implementations, data acquired by the receivers 154 in response to one or multiple dipole source firings (by dipole source(s) of the tool 150) is processed to determine a shear slowness (herein called a "dipole source-derived shear slowness" or, in an abbreviated form, a "dipole shear slowness") based on identification of a higher order formation flexural acoustic mode.

In accordance with example implementations, the formation 110 may be a fast isotropic formation 110 having an associated shear slowness that is independent of direction or a transversely isotropic with a vertical axis of symmetry (TIV) formation, which has shear slownesses associated with fast and slow shear velocity directions.

The determination of shear slowness based on identification of the higher order formation flexural acoustic mode is described herein in connection with example implementations for the following cases: an isotropic formation; a vertical borehole section of a TIV formation; and a horizontal borehole section of the TIV formation.

The simplest case of a homogeneous isotropic formations is initially considered. For this particular example, synthesized data generated by forward modeling code was used to simulate a fast formation with an LWD acoustic measurement tool being centered in the borehole. The physical parameters for the fast formation are given as: the compressional slowness, shear slowness and density of the surrounding formation are, respectively, 70 micrometers/foot (μs/ft), 110 μs/ft and 1600 kilograms/meter$^3$ (kg/m$^3$); the fluid slowness and density are 203 μs/ft and 1000 kg/m$^3$; the compression slowness, shear slowness and density of the tool are 96 μs/ft, 53 μs/ft and 7830 kg/m$^3$; the borehole radius is C=3.25 inches; and the tool inner radius A and outer radius B are 1.4125 inches and 2.4 inches, respectively. The acoustic measurement tool contains twelve axial receivers placed at a distance from 7 ft to 10.6 ft away the transmitter with an inter-element spacing of 0.3333 ft.

Figure 2A:
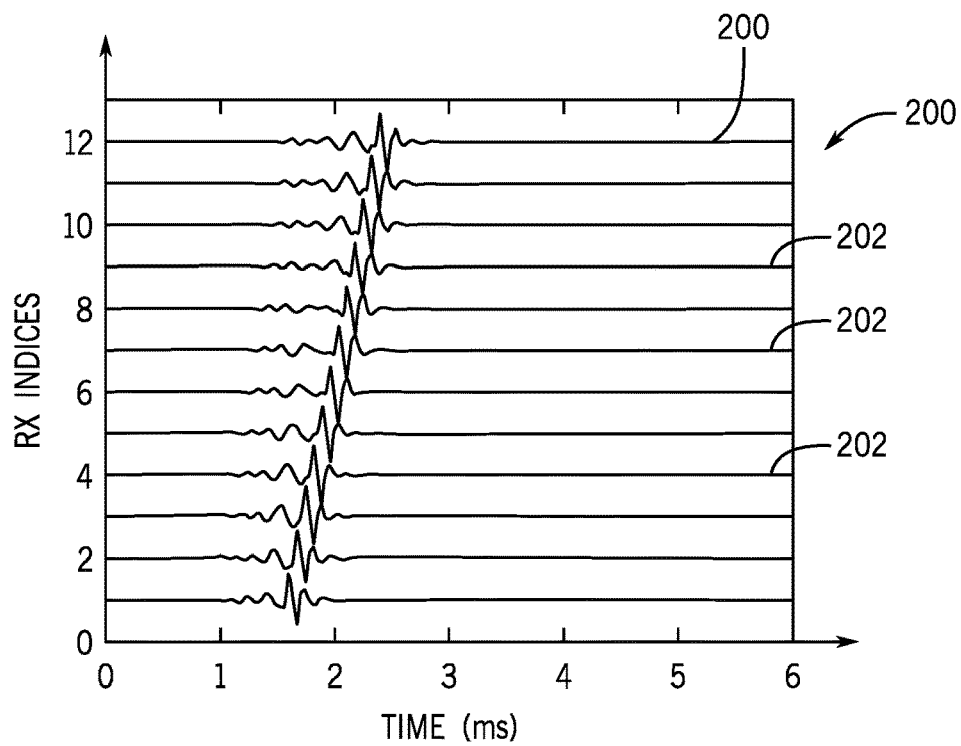
FIG. 2A is an illustration of time domain dipole waveforms acquired by an acoustic measurement tool deployed in a borehole in a fast isotropic formation according to an example implementation.

FIG. 2A is an illustration 200 of time domain dipole waveforms 202, acquired by acoustic sensors, or receivers, of an acoustic measurement tool that is centered in a fluid-field borehole and is surrounded by a fast isotropic formation. In this manner, the receivers of the acoustic measurement tool acquired data representing the time domain waveforms 202 in response to energy that was emitted by one or multiple dipole sources of the tool.

Figure 2B:
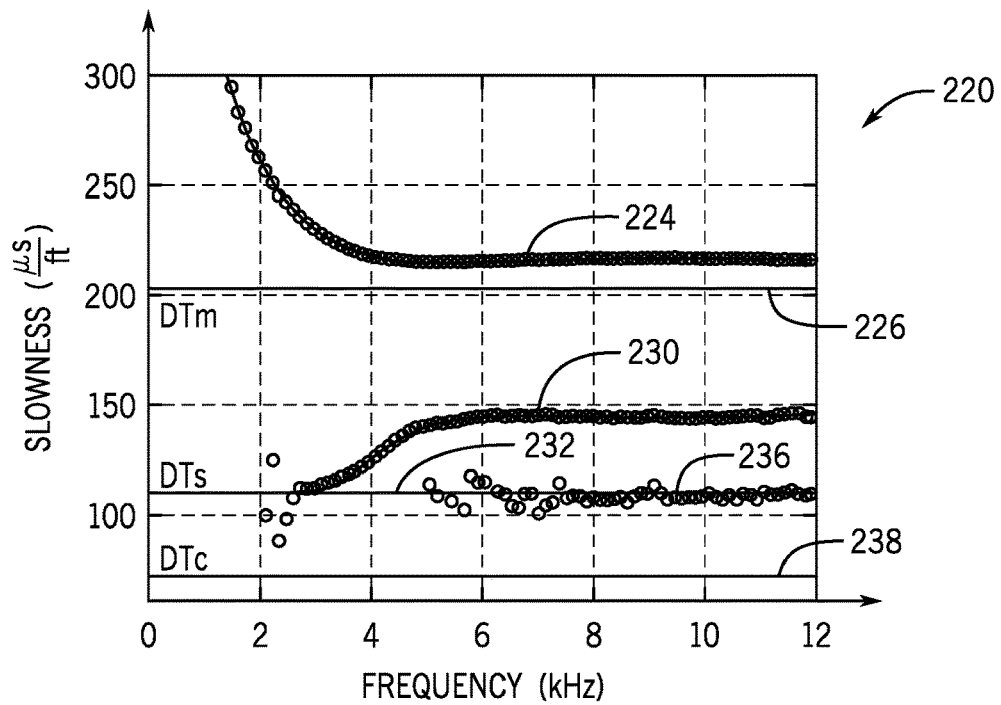
FIG. 2B is an illustration of dispersions for different acoustic modes derived from the time domain dipole waveforms of FIG. 2A according to an example implementation.

FIG. 2B is an illustration 220 of the result of processing the time domain dipole waveforms 202 to extract dispersions (slowness versus frequency curves) that are associated with different acoustic modes: a tool flexural dispersion 224, a first order formation flexural dispersion 230 and a higher order (third order, for example) formation flexural dispersion 236. In accordance with example implementations, the dispersions were extracted by processing the time domain waveforms 202 with a modified matrix pencil dispersion extraction algorithm (called the "TKO technique" herein). In accordance with example implementations, the TKO-based technique may be similar to the dispersion extraction technique that is described in Ekstrom, M. P., 1995, Dispersion Estimation from Borehole Acoustic Arrays Using a Modified Matrix Pencil Algorithm, 29th Asilomar Conference on Signals, Systems, and Computers. FIG. 2B also depicts the shear slowness $DT_S$ 232, the compressional slowness $DT_C$ 238 and the mud slowness $DT_M$ 226.

The lowest order tool flexural acoustic mode is usually dominant, as seen in the time domain waveforms 202 and its consistently smooth dispersion estimation in FIG. 2B. The first order formation flexural acoustic mode carries more information about the formation at the low-frequency range and behaves more like a tool acoustic mode, as the frequency increases. For this reason, the formation flexural acoustic mode and its low-frequency dispersion, albeit weak, may be used in a model-based workflow to determine or estimate the formation shear slowness.

However, in accordance with example implementations, a higher order flexural acoustic mode (as can be seen from dispersion 236) is present at frequencies above 6 kHz. The higher-order flexural mode is a third-order borehole acoustic mode without a tool. As depicted in FIG. 2B, the higher order formation flexural acoustic mode appears to be non-dispersive and aligns well with the formation shear slowness DTs 232. However, the higher order formation flexural acoustic mode is even weaker than the first order formation flexural mode (as can be seen from dispersion 230). Improved signal processing workflows are described herein for purposes of identifying the higher order formation flexural acoustic mode and extracting information about the higher order formation flexural mode in the presence of one or multiple other relatively stronger acoustic modes.

Figure 3A:
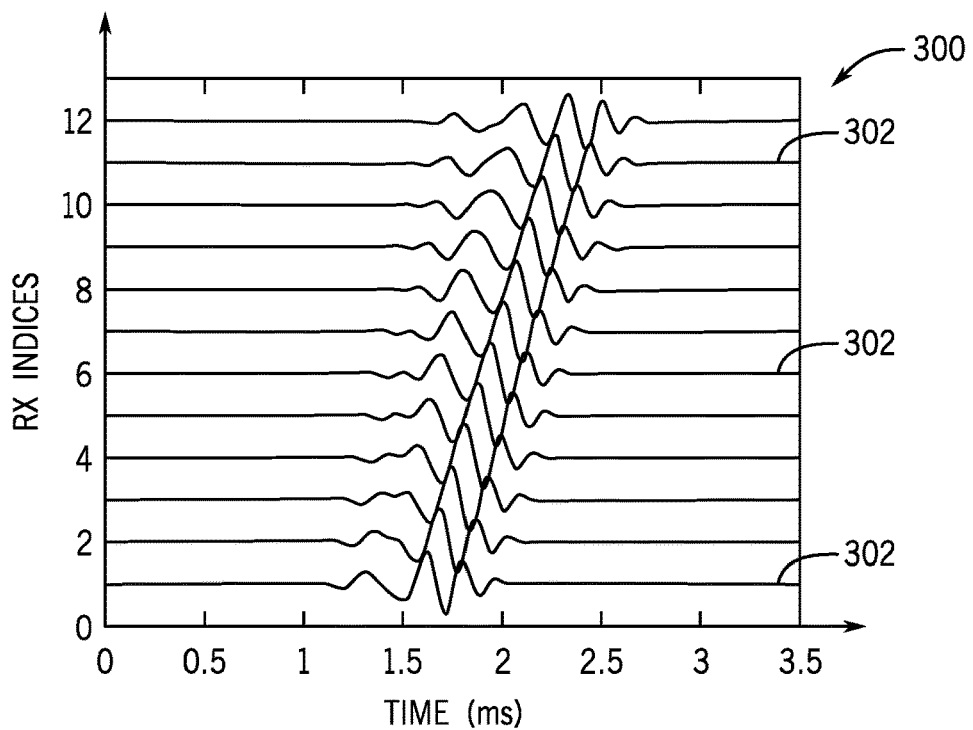
FIG. 3A is an illustration of time domain dipole waveforms acquired by an acoustic measurement tool deployed in a borehole in a vertical section of a fast transversely isotropic with vertical axis of symmetry (TIV) formation according to an example implementation.
Figure 3B:
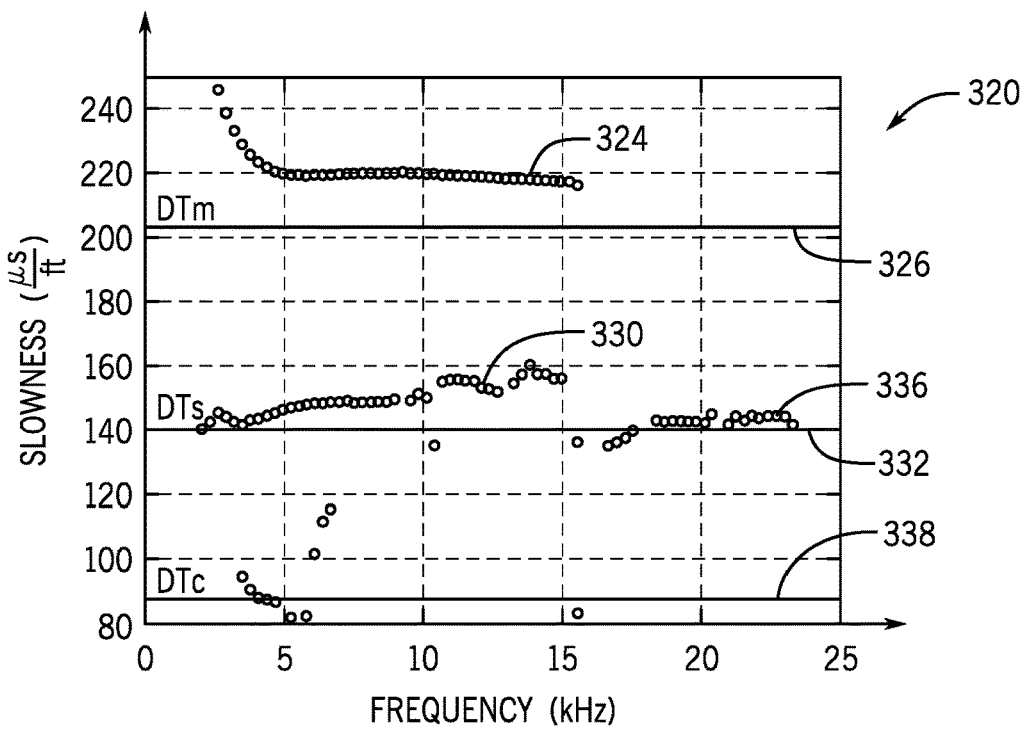
FIG. 3B is an illustration of dispersions for different acoustic modes derived from the time domain dipole waveforms of FIG. 3A according to an example implementation.

FIG. 3A is an illustration 300 of time domain dipole waveforms 302 acquired by an acoustic measurement tool when deployed in a vertical borehole section of a TIV formation. Moreover, FIG. 3B is an illustration 320 of dispersions extracted from the time domain dipole waveforms 302, including a tool flexural mode 324, a first order formation flexural mode 330 and a higher order formation flexural mode 336. Moreover, FIG. 3B depicts the compressional slowness 338, shear slowness 332 and mud slowness 326. The time domain dipole waveforms 302 and the corresponding estimated acoustic modes that are depicted in FIG. 3B were calculated using finite difference modeling (FDM) codes for a TIV formation (the Bakken shale formation, for example). The formation, mud and tool parameters for this TIV formation are set forth below:

TABLE 1

| Parameters | Values | Units |
| --- | --- | --- |
| DTs (slow) | 2170 (141) | m/s (μs/ft) |
| DTs (fast) | 2619 (116) | m/s (μs/ft) |
| DTc | 3473 (88) | m/s (μs/ft) |
| $\rho_F$ | 2230 | kg/m$^3$ |

TABLE 1-continued

| Parameters | Values | Units |
|---|---|---|
| DTm | 1500 (203) | m/s (μs/ft) |
| $\rho_M$ | 1000 | kg/m³ |
| $DTs_{tool}$ | 3110 (98) | m/s μs/ft) |
| $DT_{Ctool}$ | 5751 (53) | m/s(μs/ft) |
| $\rho_T$ | 7630 | kg/m³ |
| D | 0.1600 (6.3) | m (in) |

It is noted that FIGS. 3A and 3B are for measurements acquired in a vertical borehole section of the TIV formation. Referring to FIG. 3B, similar to the case of the isotropic formation, the tool flexural acoustic mode (associated with dispersion 324) appears to be strongest across a large frequency range, and the first order flexural acoustic mode (associated with dispersion 330) is present at the frequency up to 15 kHz. The higher-order flexural acoustic mode (associated with dispersion 336) is observed at frequencies above 15 kHz and it is slightly above the formation shear slowness 332 of 140 μs/ft.

Figure 4A:
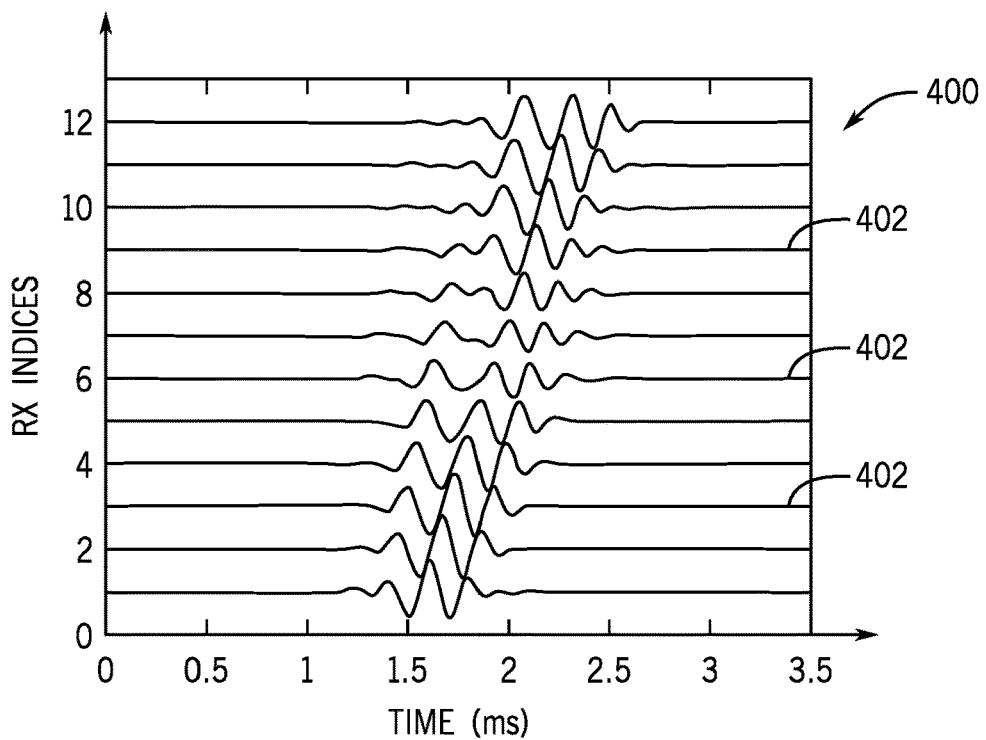
FIG. 4A is an illustration of time domain dipole waveforms acquired by an acoustic measurement tool deployed in a lateral borehole section in a fast TIV formation and associated with a fast shear velocity direction according to an example implementation.
Figure 4B:
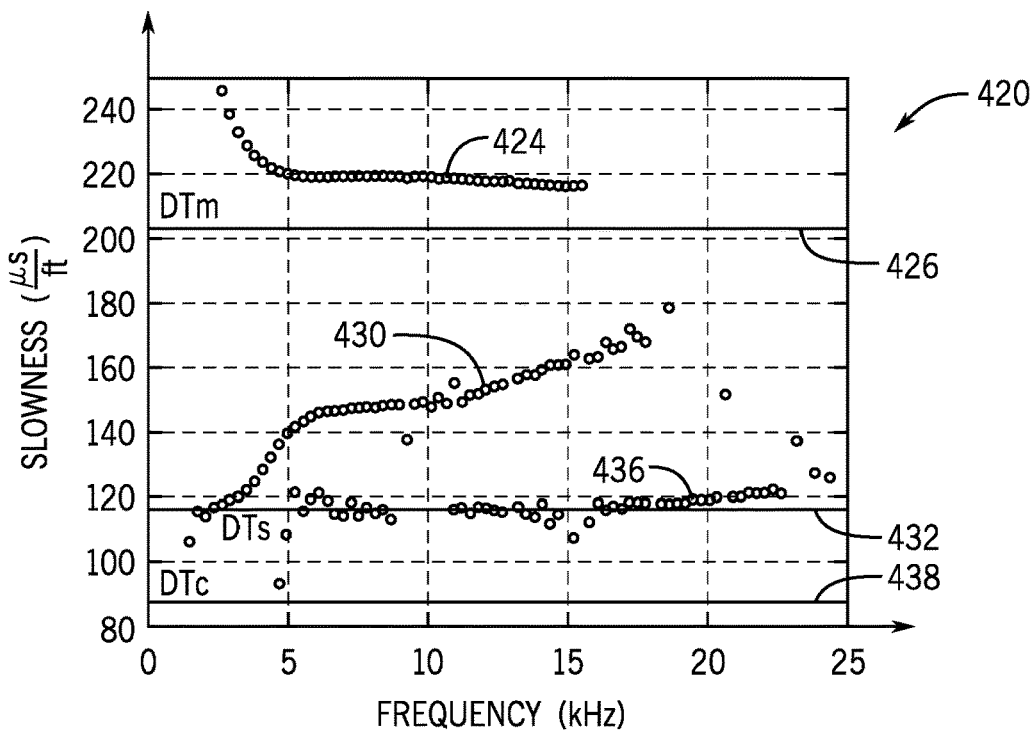
FIG. 4B is an illustration of dispersions for different acoustic modes derived from the time domain dipole waveforms of FIG. 4A according to an example implementation.

FIG. 4A is an illustration 400 of time domain dipole waveforms 402 acquired by an acoustic measurement tool when deployed in a horizontal borehole section of the TIV formation. These fast shear waveforms observed by the twelve receivers, as depicted in FIG. 4A, occurs when the dipole firing direction aligns with the direction of the fast shear velocity (i.e., the side-to-side direction). As depicted in FIG. 4B, the dispersions may be extracted from the time-domain dipole waveforms 402; and again, three acoustic modes may be identified: a tool flexural acoustic mode (associated with dispersion 424), a first order formation flexural acoustic mode (associated with dispersion 430) and a higher-order formation flexural acoustic mode (associated with dispersion 436). Moreover, FIG. 4B depicts a mud slowness 426, shear slowness 432 and compressional slowness 438. The presence of the higher order formation flexural acoustic mode is evident over the frequency range from 11 kHz to 23 kHz. The beginning portion of the higher order formation flexural acoustic mode appears to be non-dispersive, and this portion aligns well with the fast shear slowness 432 at 116 μs/ft.

Figure 5A:
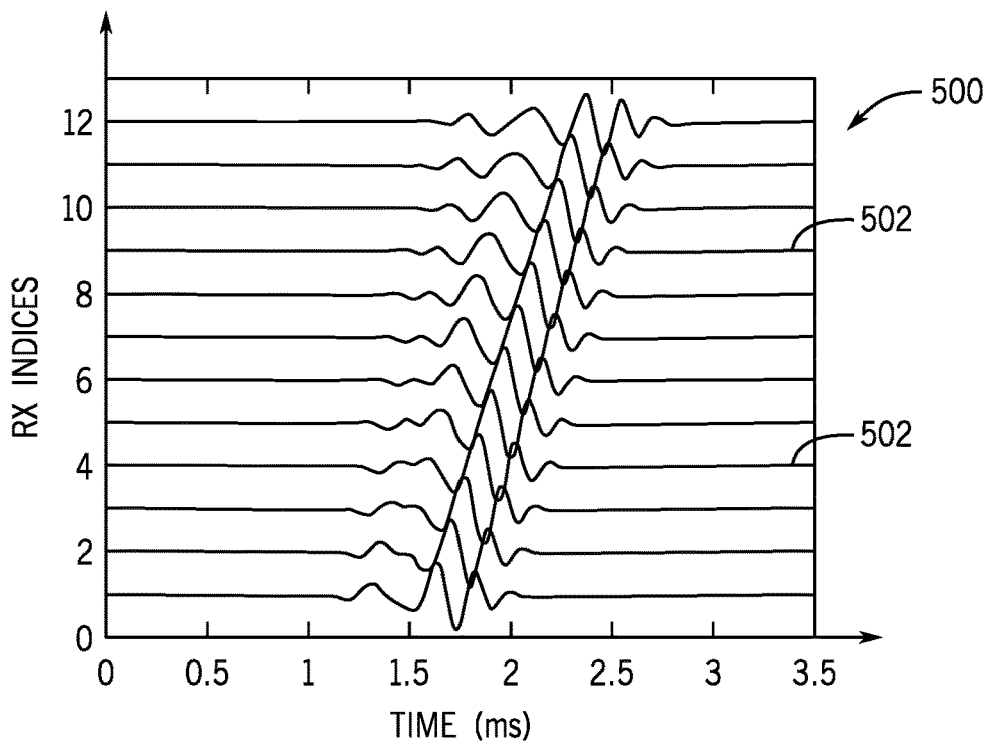
FIG. 5A is an illustration of time domain dipole waveforms acquired by an acoustic measurement tool deployed in a lateral borehole section in a fast TIV formation and associated with a slow shear velocity direction according to an example implementation.
Figure 5B:
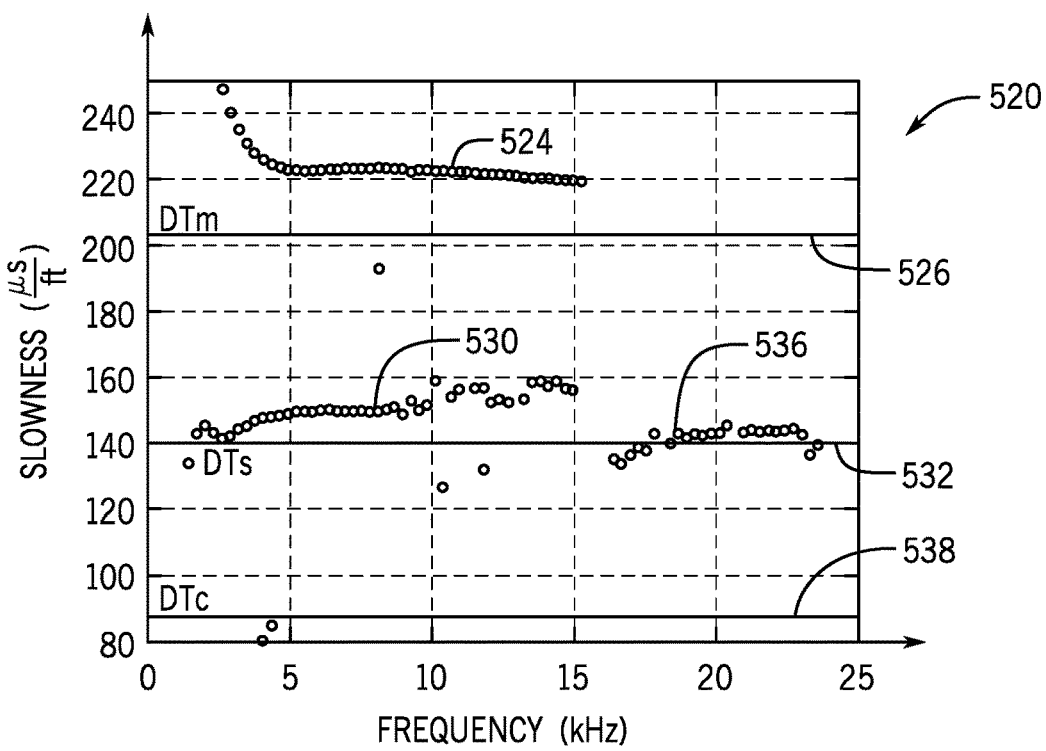
FIG. 5B is an illustration of dispersions for different acoustic modes derived from the time domain dipole waveforms of FIG. 5A according to an example implementation.

FIG. 5A is an illustration 500 of time domain dipole waveforms 502 acquired by an acoustic measurement tool when deployed in a horizontal borehole section, for the particular case when the dipole firing direction aligns with the slow shear velocity direction (i.e., the up-down direction). FIG. 5B depicts the estimated dispersions, which are associated with three acoustic modes: a tool flexural acoustic mode (associated with dispersion 524), a first order formation flexural acoustic mode (associated with dispersion 530) and a higher-order formation flexural acoustic mode (associated with dispersion 536). Moreover, FIG. 5B depicts mud 526, shear 532 and compressional 538 slownesses, respectively. The presence of the higher-order formation flexural acoustic mode is again confirmed at the frequency above 15 kHz.

From the above numerical examples, the higher order formation flexural acoustic mode is shown to be excited at high-frequencies, and the mode is less dispersive, as compared with the first order formation flexural mode. Moreover, the non-dispersive portion of the higher order formation flexural acoustic mode, which is the lower frequency, beginning portion, aligns with the formation shear slowness. Therefore, the higher-order formation flexural acoustic mode provides a way to extract the shear slowness by identifying its non-dispersive part.

More importantly, both the fast and slow shear slownesses may be extracted by using the higher-order flexural acoustic mode in a horizontal borehole section of a TIV formation.

Figure 6A:
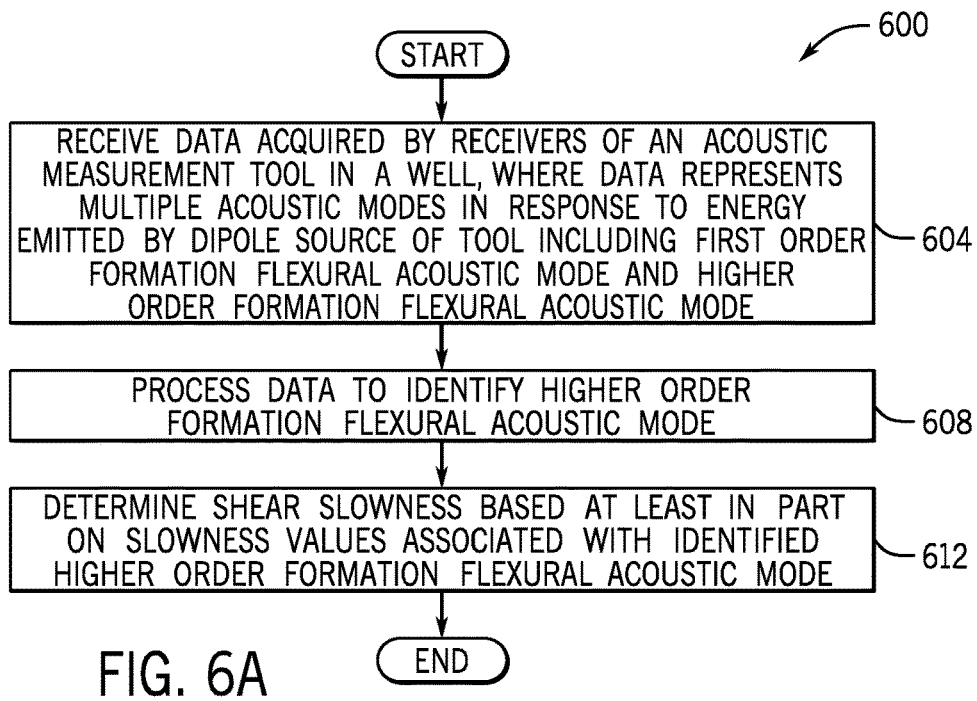
FIG. 6A is a flow diagram depicting a technique to determine a shear slowness based on an identified higher order formation flexural acoustic mode according to an example implementation.

Referring to FIG. 6A, in accordance with example implementations, a technique 600 to estimate at least one shear slowness includes receiving (block 604) data acquired by sensors, or receivers, of an acoustic measurement tool in a well. The data represents multiple acoustic modes in response to energy emitted by a dipole source of the tool, including a first order formation flexural acoustic mode and a higher order formation flexural acoustic mode. Pursuant to the technique 600, the data may be processed (block 608) to identify the higher order flexural borehole acoustic mode; and, pursuant to the technique 600, a shear slowness may be determined (block 612) based at least in part on slowness values that are associated with the identified higher order flexural borehole acoustic mode.

Figure 6B:
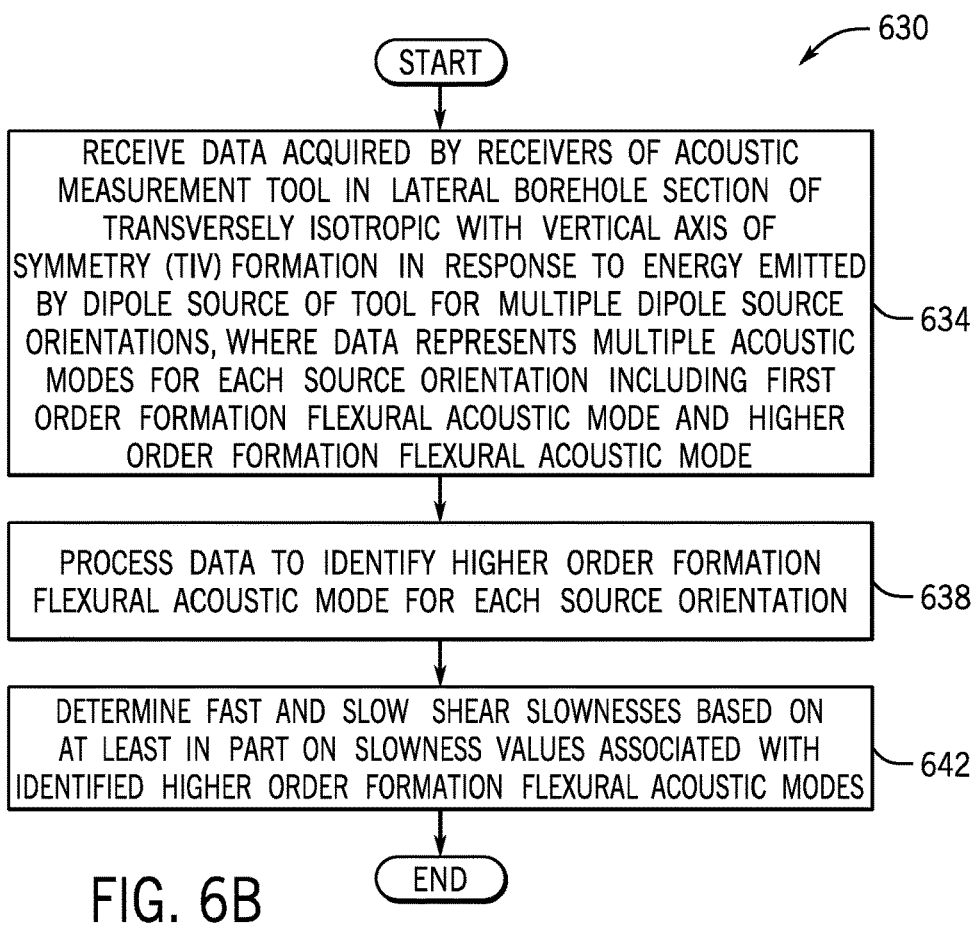
FIG. 6B is a flow diagram depicting a technique to determine fast and slow shear slownesses based on identified higher order formation flexural acoustic modes according to an example implementation.

More specifically, referring to FIG. 6B, in accordance with example implementations, a technique 630 may be used for purposes of determining the fast and slow shear slownesses. Pursuant to the technique 630, data is received (block 634), which is acquired by receivers of an acoustic measurement tool in a lateral borehole section of a transversely isotropic with vertical axis of symmetry (TIV) formation in response to energy that is emitted by a dipole source of the tool for multiple dipole source orientations. The data represents multiple acoustic modes for each dipole source orientation, including a third order flexural borehole acoustic mode. These multiple acoustic modes includes a first order formation flexural acoustic mode and a higher order formation flexural acoustic mode. Pursuant to the technique 630, the data may be processed (block 638) to identify the higher order formation flexural borehole acoustic mode for each dipole source orientation; and, pursuant to block 642, fast and slow shear slownesses may be determined based at least in part on slowness values that are associated with the identified higher order flexural borehole acoustic modes.

Figure 7:
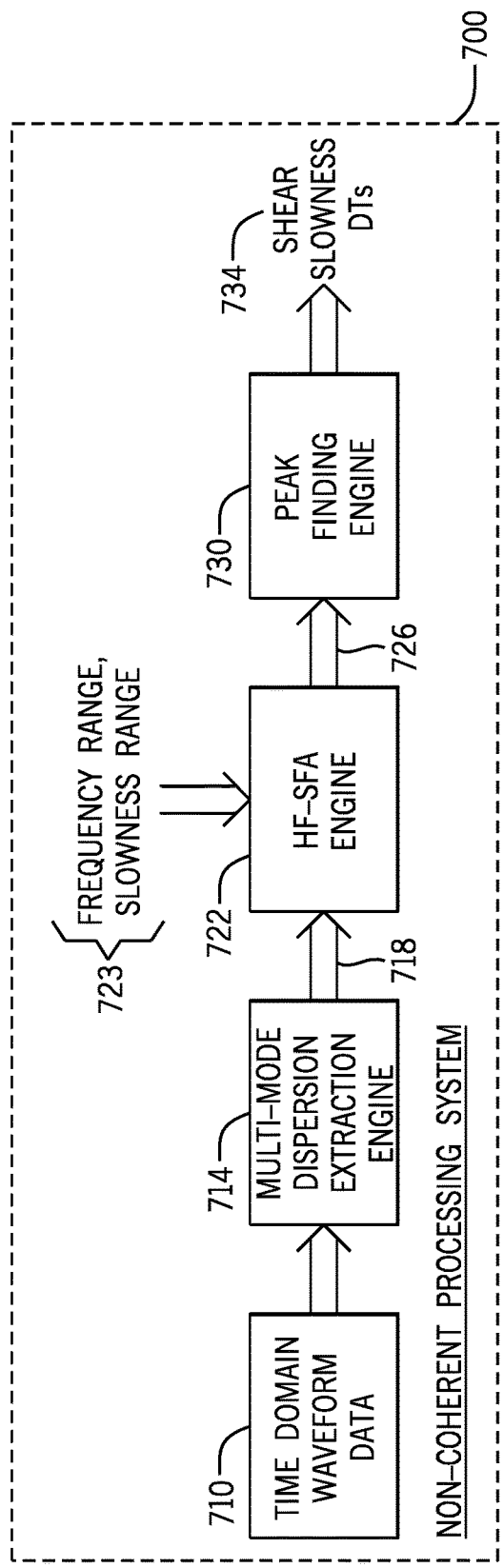
FIG. 7 is a schematic diagram of a non-coherent processing system to determine a shear slowness according to an example implementation.

As described herein, depending on the particular implementation, either a non-coherent processing scheme or a coherent processing scheme may be used to identify the higher order formation flexural mode and extract information from the mode to determine a shear slowness. More specifically, referring to FIG. 7, in accordance with some implementations, a non-coherent processing system 700 may be used. In general, the non-coherent processing system includes a multi-mode dispersion extraction engine 714, which processes time domain waveform data 710 for purposes of producing an output 718 representing extracted acoustic modes, including the first and third order formation flexural acoustic modes. The output 718, in turn, is processed by a high frequency slowness frequency analysis (HF-SFA) engine 722 based on such input parameters 723 as a slowness range and a frequency range. These ranges may be user selected, in accordance with example implementations. The HF-SFA engine 722, in turn, non-coherently integrates the dispersion energy along the frequency axis to provide an output 726. A peak finding engine 730 of the system 700, in turn, identifies at least one peak in the integrated energy, and this peak corresponds to an estimated or determined shear slowness $DT_S$ 734.

More specifically, in accordance with example implementations, the multi-mode dispersion extraction may be performed by one or several techniques, which process the array waveforms in either the space-frequency domain or the space-time-frequency domain. For the space-time-frequency approach, the continuous wavelet transform may be selected, in accordance with example implementations. For the space-frequency approach, a narrowband (single-frequency) technique, such as Prony's technique, or the TKO technique may be selected. A broadband technique, i.e., a technique that uses multiple frequencies, may be alternatively be used for the space-frequency approach, such as the broadband maximum likelihood (ML) technique, the broadband LASSO technique, the broadband sparse Bayesian learning (SBL) technique, or a broadband spatial smoothing-Capon (BBSS-Capon) technique, which is further described herein.

In accordance with example implementations, the broadband approach may be used over the narrowband approach for the weak mode extraction because the broadband approach simultaneously utilizes the array waveforms over multiple frequency points, and, in general, is less susceptible to noise. As an example, synthetic noise contamination was added to the synthetically-generated time domain waveforms 202 of FIG. 2A; and broadband and narrowband dispersion extraction were applied. The dispersion extraction results are depicted in FIG. 8A for the narrowband approach (the TKO technique) and FIG. 8B for the broadband technique (the BBSS-Capon technique).

Figure 8A:
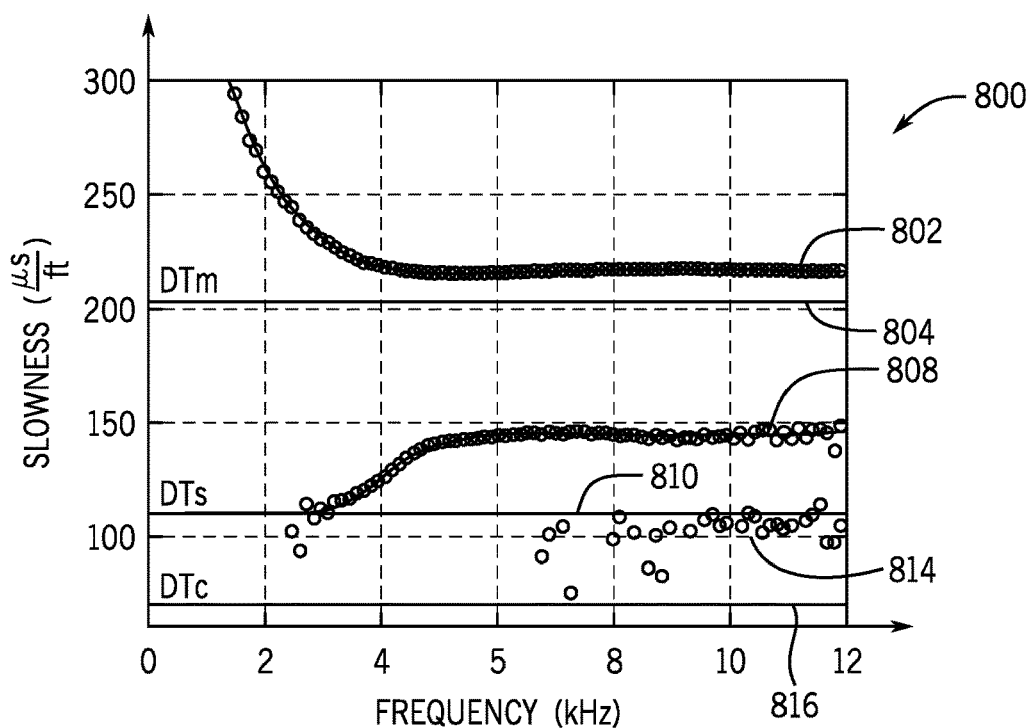
FIG. 8A is an illustration of dispersions extracted through narrowband processing according to an example implementation.
Figure 8B:
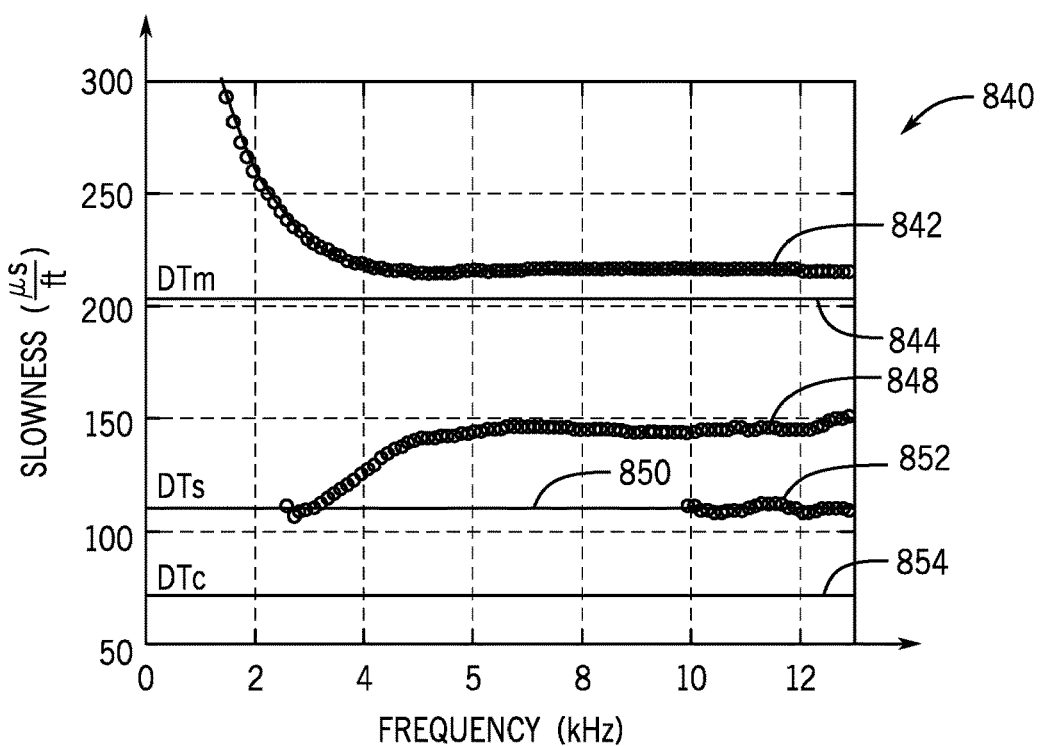
FIG. 8B is an illustration of dispersions extracted through broadband processing according to an example implementation.

In this manner, FIG. 8A is illustration 800 of an extracted tool flexural dispersion 802, a first order formation flexural dispersion 808 and a higher order flexural dispersion 808 derived using TKO-based dispersion extraction. Moreover, FIG. 8A depicts a mud slowness 804, shear slowness 810 and compressional slowness 816. FIG. 8B is an illustration 840 of an extracted tool flexural dispersion 842, first order formation flexural dispersion 848 and higher order formation flexural dispersion 852, derived using BBSS-Capon-based dispersion extraction. FIG. 8B also depicts a mud slowness 844, shear slowness 850 and compressional slowness 854.

A comparison of FIGS. 8A and 8B reveals that, with the injected noise contamination, both dispersion extraction techniques have similar results for the tool flexural and the first-order formation flexural dispersions, since both corresponding acoustic modes have relatively large signal-to-noise ratios (SNRs). On the other hand, the performance is different for the higher-order flexural mode at the higher frequencies. Compared with the scattered dispersion estimates from the narrowband approach, the extracted higher-order flexural dispersion appears to be more stable and aligns better with the formation shear slowness. As a result, the broadband approach is adopted herein for the workflow for the performance evaluation.

Referring back to FIG. 7, after the multi-mode dispersion extraction engine 714 extracts the dispersions associated with the multiple acoustic modes, the HF-SFA engine 722 non-coherently integrates the dispersion energy along the frequency axis. In this manner, the HF-SFA engine 722 integrates the absolute values of the amplitudes. In accordance with some implementations, the HF-SFA engine 722 performs a technique similar to the slowness-frequency analysis projection (SFP) technique that is used for wireline sonic logging. However the techniques are different, as the SFP sed for wireline sonic logging projects the slowness-frequency dispersion curves over a selected frequency band to a one-dimensional function, while the HF-SFA engine 722, in accordance with example implementations, sums up the energy of the dispersion curves along the frequency domain to maximize the energy over the non-dispersive section of the higher order formation flexural acoustic mode.

Figure 9A:
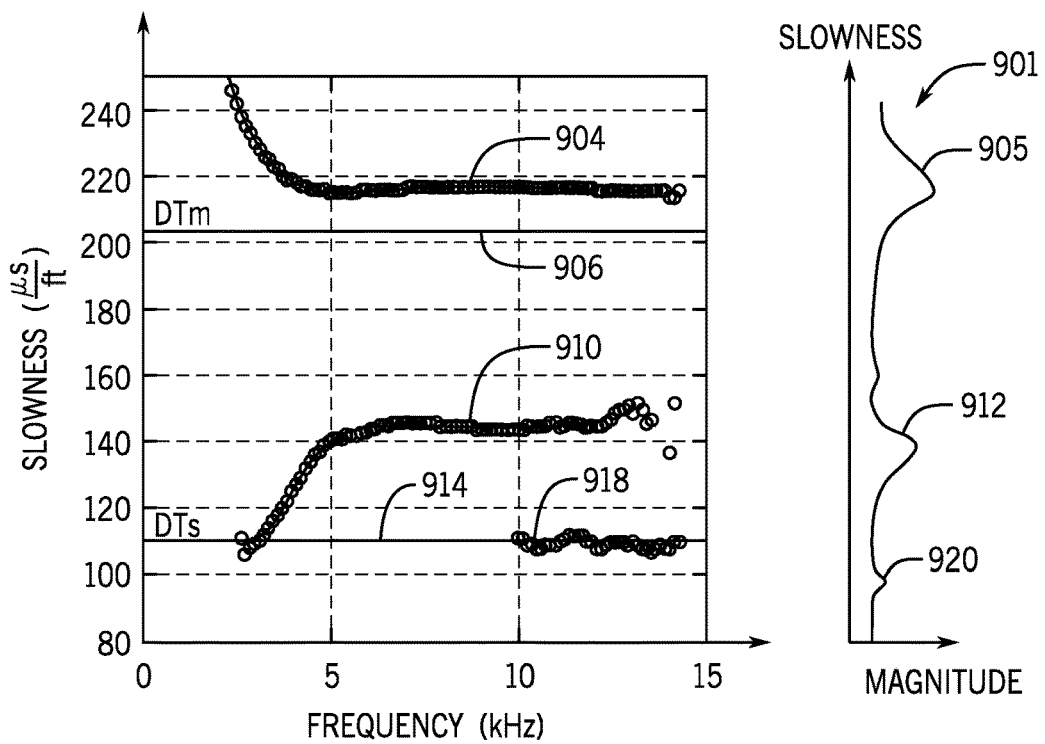
FIG. 9A is an illustration of dispersions extracted through broadband spatial smoothing-Capon (BBSS-Capon) processing over a relatively larger frequency range and a non-dispersive integration log associated with selected portions of the dispersions according to an example implementation.

As a more specific example, the results depicted in FIG. 8B may be integrated over the frequency range [10, 15] kHz and the slowness range [80, 250] μs/ft to maximize the non-dispersive energy. For this example, reference numerals 904, 906, 910, 914 and 918 of FIG. 9A correspond to reference numerals 842, 844, 848, 850 and 852, respectively, of FIG. 8B. A corresponding log 901 of the integration is also illustrated in FIG. 9A. As can be noted from the log 901, there are three peaks. The two relatively strong peaks at 905 and 912 correspond to tool and first order formation flexural asymptotic slownesses of 217 μs/ft and 145 μs/ft, respectively. The relatively weaker peak at 920 corresponds to the higher order formation flexural asymptotic slowness of 109 u μs/ft. Compared with the true formation shear slowness of 110 μs/ft, the HF-SFA together with the broadband dispersion extraction method gives relatively accurate estimation of the shear slowness.

Figure 9B:
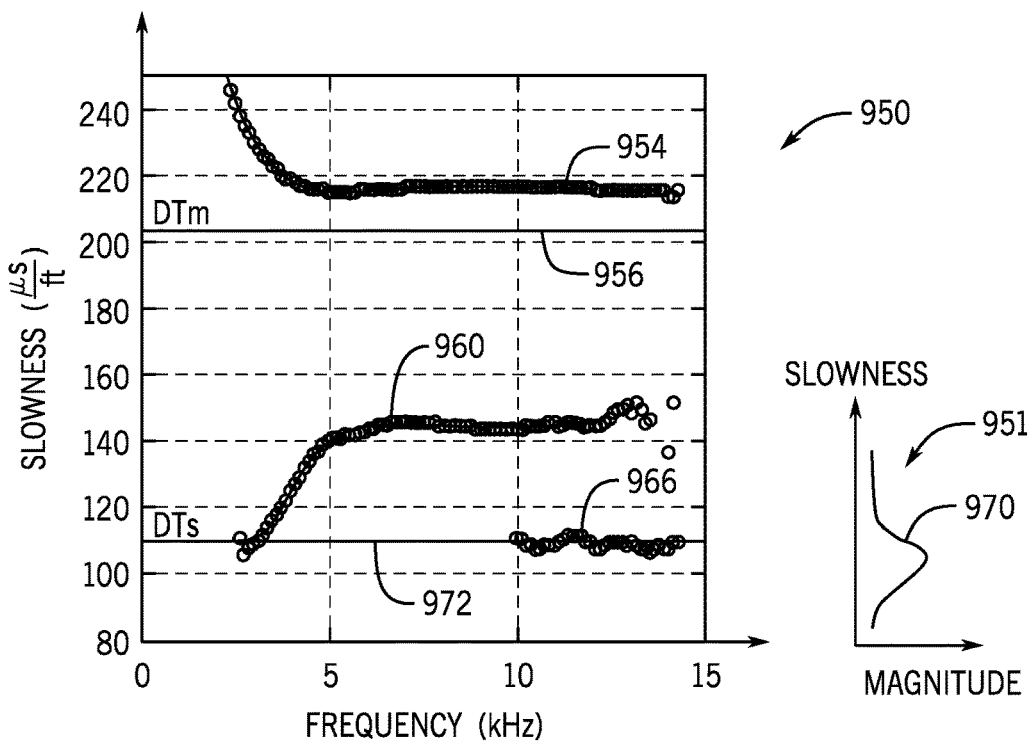
FIG. 9B is an illustration of dispersions extracted through BBSS-Capon processing and a non-dispersive integration log associated with a selected frequency range of the dispersion associated with a higher order formation flexural acoustic mode according to an example implementation.

For purposes of enhancing the higher-order flexural asymptotic-derived slowness estimation, the slowness range may be limited for the integration to exclude the tool and first order formation flexural modes. For the same example in FIG. 8B, the integration is performed over the same frequency range [10, 15] kHz but a smaller slowness range of [80, 135] μs/ft. The resulting integration log 951 is depicted FIG. 9B. In FIG. 9B, reference numerals 954, 956, 960, 972 and 966 correspond to reference numerals 842, 844, 848, 850 and 852, respectively, of FIG. 8B. The integration log 951 has a stronger peak 970 (as compared to the log 901 of FIG. 9A), which corresponds to the higher order formation flexural asymptotic slowness of 109 μs/ft.

Figure 10:
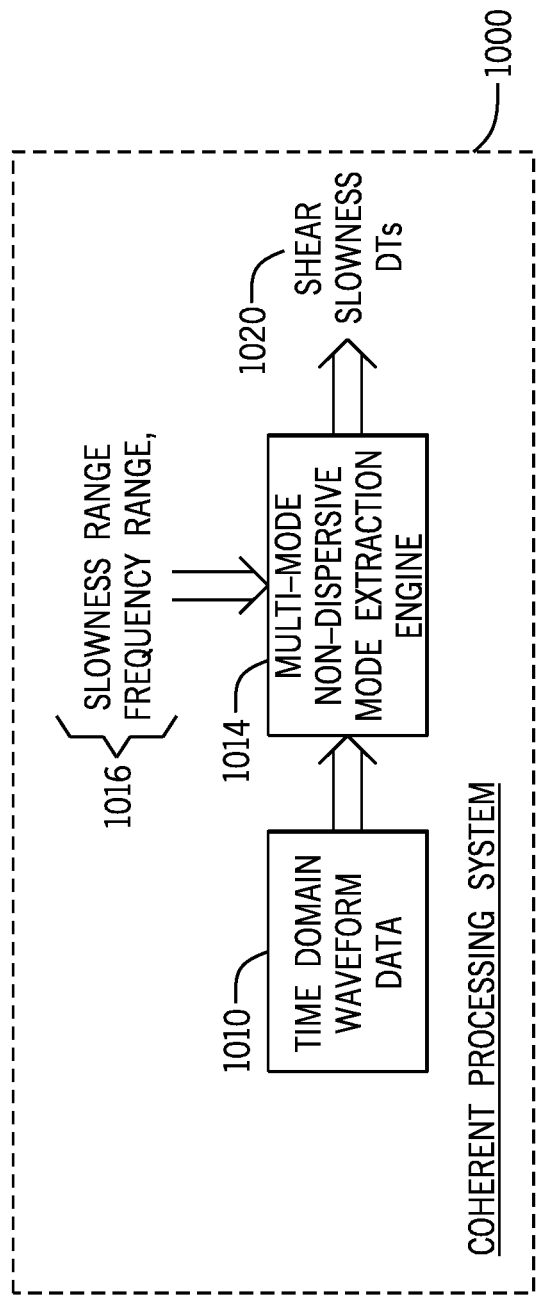
FIG. 10 is a schematic diagram of a coherent processing system to determine shear slowness according to an example implementation.

In accordance with further example implementations, coherent processing workflow may be used to directly process the time domain waveform data to estimate or determine the shear slowness without first perform dispersion extraction. More specifically, in accordance with example implementations, a coherent processing system 1000 of FIG. 10 may be used to determine or estimate a shear slowness $DT_S$ 1020. In particular, the system 1000 includes a multi-frequency non-dispersive mode extraction engine 1014, which receives time domain waveform data 1010 and inputs 1016, such as, for example, user-selected slowness and frequency ranges; and the engine 1014 determines the shear slowness $DT_S$ 1020 in response thereto.

Figure 11:
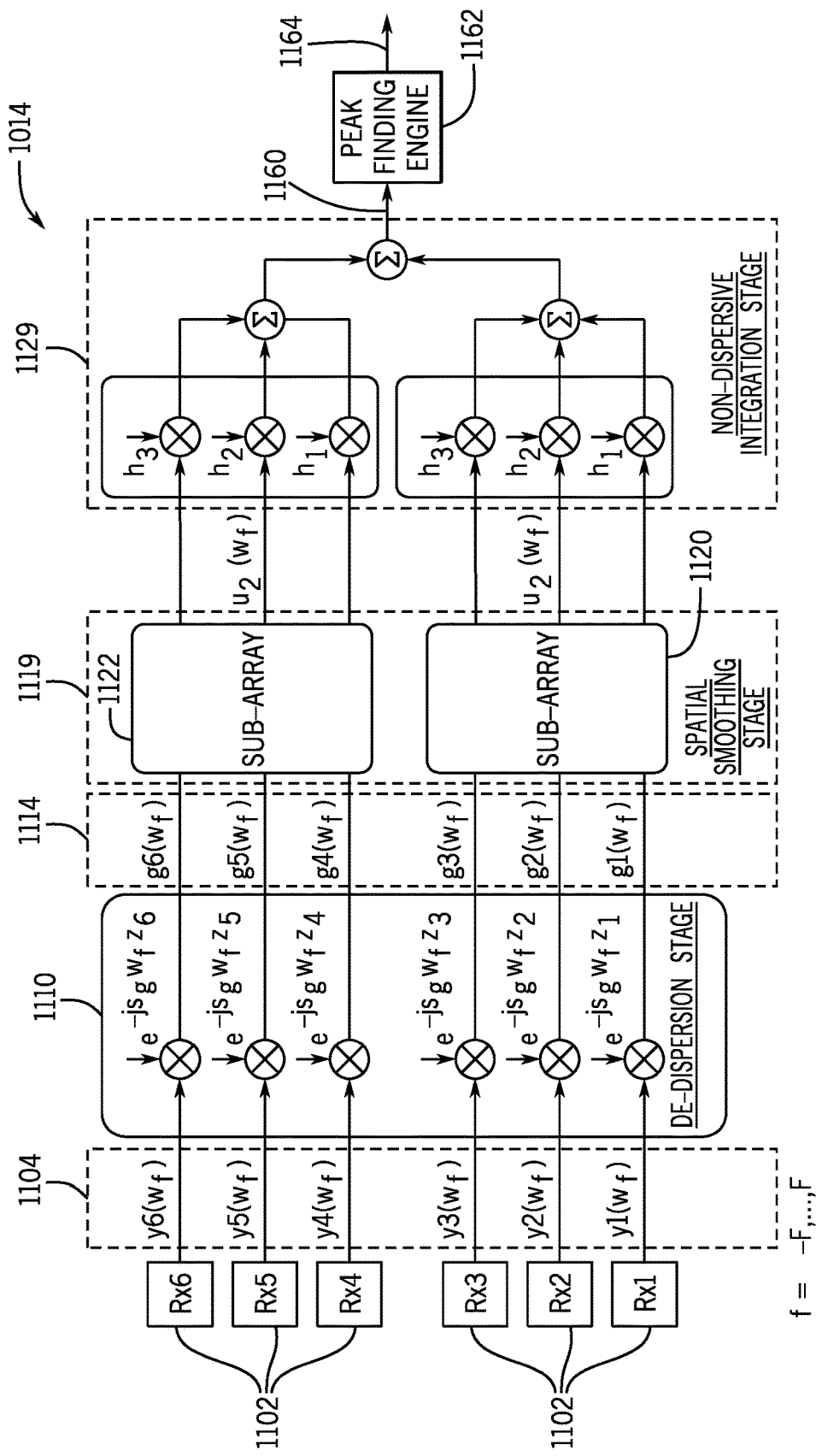
FIG. 11 is a schematic diagram of a multi-mode non-dispersive mode extraction engine of FIG. 10 according to an example implementation.

In accordance with some implementations, the multi-mode non-dispersive extraction engine 1014 may have architecture similar to or the same as the one that is depicted in FIG. 11. In accordance with example implementations, the multi-mode non-dispersive extraction engine 1014 first applies the fast Fourier transform (FFT) to the time domain waveforms that are sensed at each receiver 1102 to form frequency domain waveforms 1104. The FFT is described below:

$$y_l(w)=\text{FFT}(y_l(t)), l=1,2,L,L, \qquad \text{Eq. 1}$$

where "$y_l(t)$" represents the time-domain acoustic waveform at receiver "l, $y_l(w)$" represents the frequency-domain complex waveform at frequency ω and receiver l; and "L" represents the number of receivers.

For a given range of slowness and frequency, a space-frequency data block Y may then be determined. For example, the slowness range may be specified by the user as [50, 250] μs/ft and the frequency range may be selected to be [10, 15] kHz. Assuming there are (2F+1) frequency points in the selected frequency range, the space-frequency data block Y may be described as follows:

$$Y=[y(\omega_{-F}), y(\omega_0), y(\omega_F)], \qquad \text{Eq. 2}$$

where "$y(\omega)=[y_1(\omega), y_2(\omega), y_L(\omega)]^T$" an L×1 vector and collects the array waveforms from L receivers at frequency ω;

the superscript "T" represents the vector transpose; and the center frequency is represented by "$\omega_0$."

As depicted in FIG. 11, the multi-mode non-dispersive extraction engine 1014 includes a de-dispersion stage 1110 for purposes of performing wavenumber de-dispersion.

More specifically, for the array waveform $y(w_f)$ at frequency $w_f$, a potential group slowness $s_g$ is used to remove the mode dispersion in the wavenumber-frequency domain. Mathematically, the wavenumber de-dispersion may be described as follows:

$$g(s_g, w_f) = E^H(s_g, w_f) y(w_f), f = -F, L, 0, L, F, \quad \text{Eq. 3}$$

where "$E(s_g, w_f) = \text{diag}\{e^{js_g w_f z_1} e^{js_g w_f z_2} L\ e^{js_g w_f z_L}\}$" represents a diagonal matrix with "$z_l$" representing the distance between the transmitter and the l-th receiver. It is noted that, for the non-dispersive mode extraction, the group slowness is set to be equivalent to the phase slowness.

As depicted in FIG. 11, the multi-mode non-dispersive extraction engine 1100 includes a spatial smoothing stage 1119 for purposes of smoothing the de-dispersion results along the receiver offset direction. More specifically, for a given $g(s_g, w_f)$, form multiple sub-vectors according to a chosen sub-vector length M. The sub-vectors may be formed by sub-arrays of the stage 1120, such as example sub-arrays 1120 and 1122. As an example, one choice of the spatial smoothing operation is to form the maximally overlapping sub-vectors as described as follows:

$$u_n(s_g, w_f) = [g_n(s_g, w_f) g_{n+1}(s_g, w_f), L, g_{n+M-1}(s_f, w_f)]^T, n = 1, 2, L, L+M-1 \quad \text{Eq. 4}$$

where $g_n(s_g, w_f)$ is the n-th element in the de-dispersed vector $g(s_g, w_f)$. Note that, given the sub-vector length, the number of sub-vectors is L+M−1.

The spatially-smoothed output form the smoothing stage 1119 is then non-dispersively integrated by a non-dispersive integration stage 1129 of the multi-mode non-dispersive extraction engine 1014. In this context, the "non-dispersive integration" refers to accumulating energy propagating at a constant slowness in a given frequency band. As described further below, the non-dispersive integration stage 1129 may search for peaks in the Capon spectrum, corresponding to the higher order formation flexural acoustic mode, as described further below in connection with Eq. 7. In this manner, in accordance with example implementations, the non-dispersive integration stage 1129 performs a multi-frequency non-dispersive Capon technique with spatial smoothing to determine the inverse of the integrated energy of the wavenumber de-dispersived signal $g(s_g, w_f)$ over multiple frequency points, as described below:

$$\ell(s_g) = \frac{1}{1^T [\sum_{f=-F}^{F} \sum_{n=1}^{L-M-1} u_n(s_g, \omega_f) u_n^H(s_g, \omega_f)]^{-1} 1} \quad \text{Eq. 5}$$

where "1" represents a column vector of all 1 elements. In the non-dispersive integration stage 1129, the non-dispersive integration may be achieved by setting the vector of h as follows:

$$h = \frac{R_u^{-1} 1}{1^T R_u^{-1} 1}, \quad \text{Eq. 6}$$

where $R_u \hat{a}_{f=-F}^{F} \hat{a}_{n=1}^{N-M+1} u_n(w_f) u_n^H(w_f)$.

A peak finding engine 1162 of the multi-mode non-dispersive extraction engine 1014 may then apply a peak finding algorithm to the Capon spectrum that is represented at an output 1160 of the non-dispersive integration stage 119 for purposes of finding peaks from the non-dispersive slowness estimation, according to a specified number of peaks and the chosen mask length (user selected options, for example).

In accordance with further example implementations, the spatial smoothing may be omitted. Without spatial smoothing, the multi-frequency non-dispersive Capon technique computes the spectrum as follows:

$$\ell(s_g) = \frac{1}{1^T [\sum_{f=-F}^{F} E^H(s_g, \omega_f) y(w_f) y^H(w_f) E(s_g, w_f)]^{-1} 1} \quad \text{Eq. 7}$$

It is also interesting to compare the above multi-frequency non-dispersive Capon method of Eq. 7 with the multi-frequency (broadband) maximum likelihood estimation of the non-dispersive modes, as described below:

$$\ell(s_g) = 1^T [\sum_{f=-F}^{F} E^H(s_g, \omega_f) y(w_f) y^H(w_f) E(s_g, w_f)] 1 \quad \text{Eq. 8}$$

$$= \|y^H(w_f) S(s_g, w_f)\|^2$$

where "$s(s_g, w_f) = [e^{js_g w_f z_1} e^{js_g w_f z_2} L\ e^{js_g w_f z_L}]^T$" is represented by the diagonal elements of $E(s_g, w_f)$.

Figure 12:
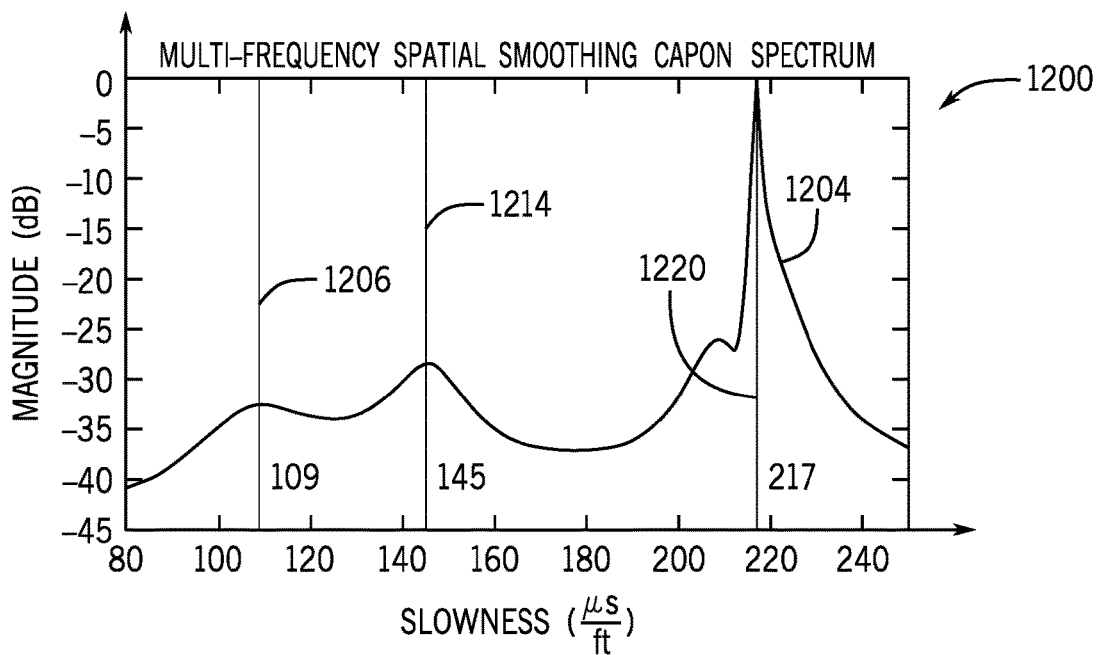
FIG. 12 is an illustration of the multi-frequency spatial smoothing Capon spectrum for a relatively large slowness range according to an example implementation.

In accordance with example implementations, the coherent processing system 1000 processed the same synthetically generated noise contaminated time domain waveform data that was processed by the non-coherent processing system 700. Moreover, the coherent processing was performed over the frequency range [10, 15] kHz and the slowness range [80, 250] μs/ft. The result is depicted in FIG. 12. In this manner, FIG. 12 is an illustration 1200 of a Capon spectrum 1204 generated at the output 1160 of the non-dispersive integration stage 1129 (FIG. 11). The Capon spectrum has three peaks corresponding to slownesses at 109 μs/ft (at reference numeral 1206), 145 μs/ft (at reference numeral 1214) and 217 μs/ft (at reference numeral 1220). For comparison, the actual formation shear slowness is 110 μs/ft, which is close to the slowness at the peak that corresponds to the higher order formation flexural acoustic mode.

Figure 13:
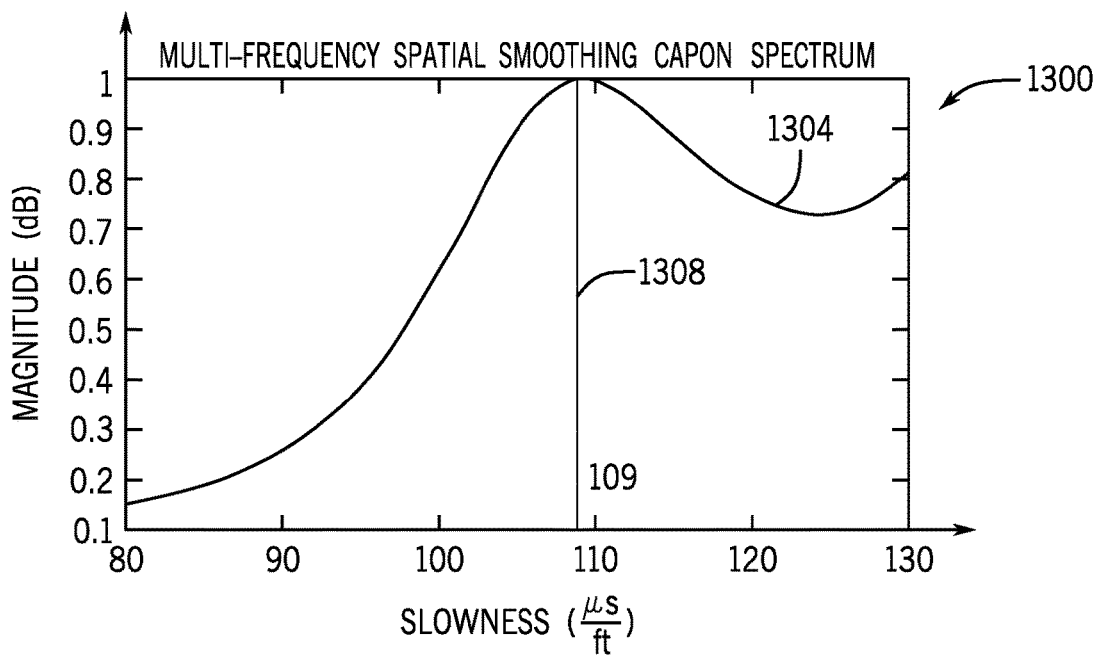
FIG. 13 is an illustration of the multi-frequency spatial smoothing Capon spectrum for a relatively small slowness range according to an example implementation.

For purposes of highlighting the higher-order flexural asymptotic behavior, the slowness range was limited to [80, 130] μs/ft, i.e., limited to the range of the expected value for the shear slowness. The result is depicted in FIG. 13, which is an illustration 1300 of the resulting Capon spectrum 1304 having the strongest peak 1308 located at 109 μs/ft, near the formation shear slowness at 110 μs/ft.

In the following, results are presented illustrating non-coherent and coherent processing for a TIV formation, including a vertical borehole section and a horizontal borehole section. A TIV formation has a vertical axis of symmetry. As such, for the vertical borehole section, a single shear slowness is determined, whereas for the horizontal borehole section, two shear slownesses may be determined, a fast shear slowness and a slow shear slowness, depending on the orientation of the dipole source of the acoustic measurement tool.

The time domain dipole waveforms 302 (corresponding to a vertical borehole section of a TIV formation) are depicted in FIG. 3A. Both the coherent and non-coherent workflows were applied to these time domain waveforms to yield the Capon spectrums that are illustrated in FIGS. 14A and 14B.

Figure 14A:
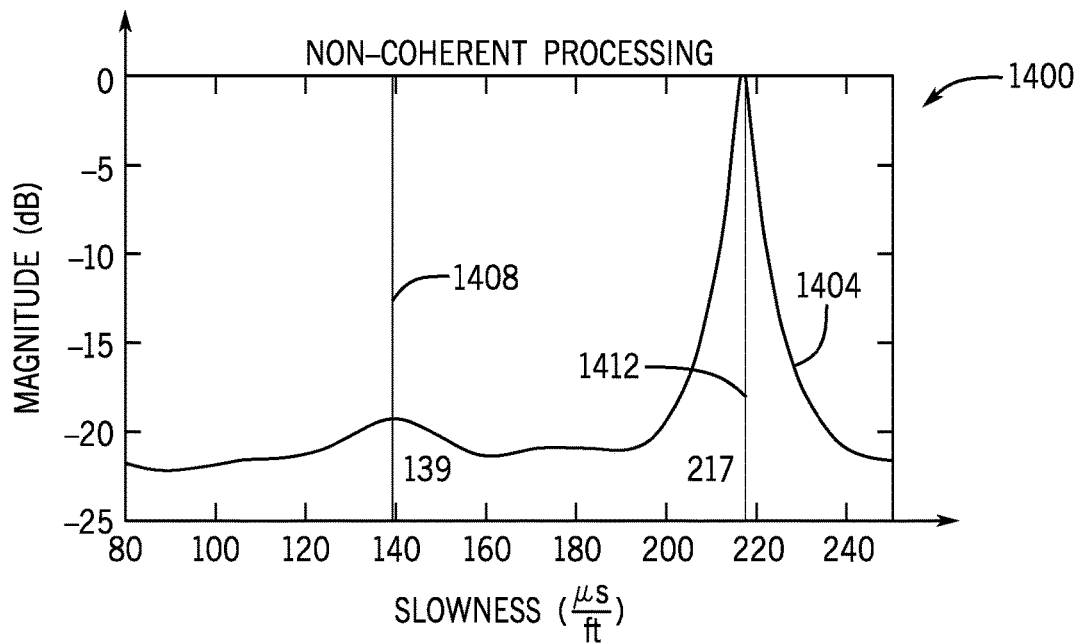
FIG. 14A is an illustration of a Capon spectrum and the use of non-coherent processing to determine a shear slowness for a vertical borehole section of a TIV formation according to an example implementation.
Figure 14B:
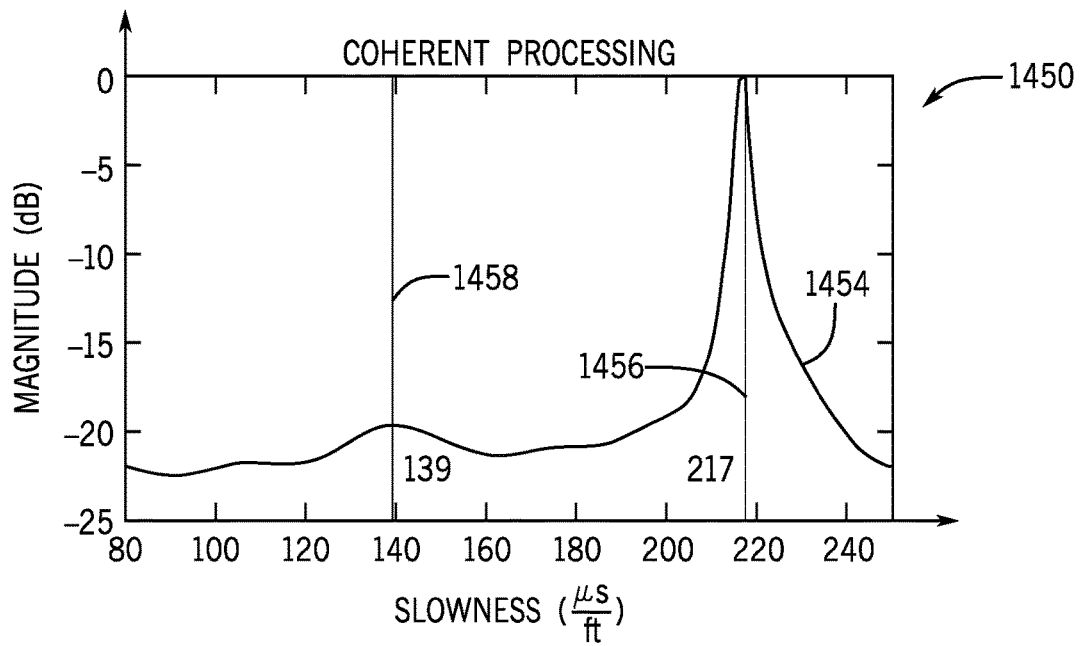
FIG. 14B is an illustration of a Capon spectrum and the use of coherent processing to determine a shear slowness for a vertical borehole section of a TIV formation according to an example implementation.

In particular, FIG. 14A is an illustration 1400 of a Capon spectrum 1404 generated by the non-coherent processing, and FIG. 14B is an illustration 1450 of a Capon spectrum 1454 generated by the coherent processing. The selected frequency range is [15, 20] kHz, and the selected slowness range is [80, 250] kHz. By searching for two peaks, the non-dispersive section of the tool flexural mode was identified at 217 µs/ft (shown at 1412 in FIG. 14A and 1456 in FIG. 14B), and non-dispersive section of the higher-order flexural mode was identified at 139 µs/ft (shown at reference numerals 1408 and 1458 in FIGS. 14A and 14B, respectively). For reference, the actual formation shear slowness is 140 µs/ft. For the non-coherent workflow, the BBSS-Capon technique with a 1-kHz bandwidth was used for the first step of the multi-mode dispersion extraction.

Figure 15A:
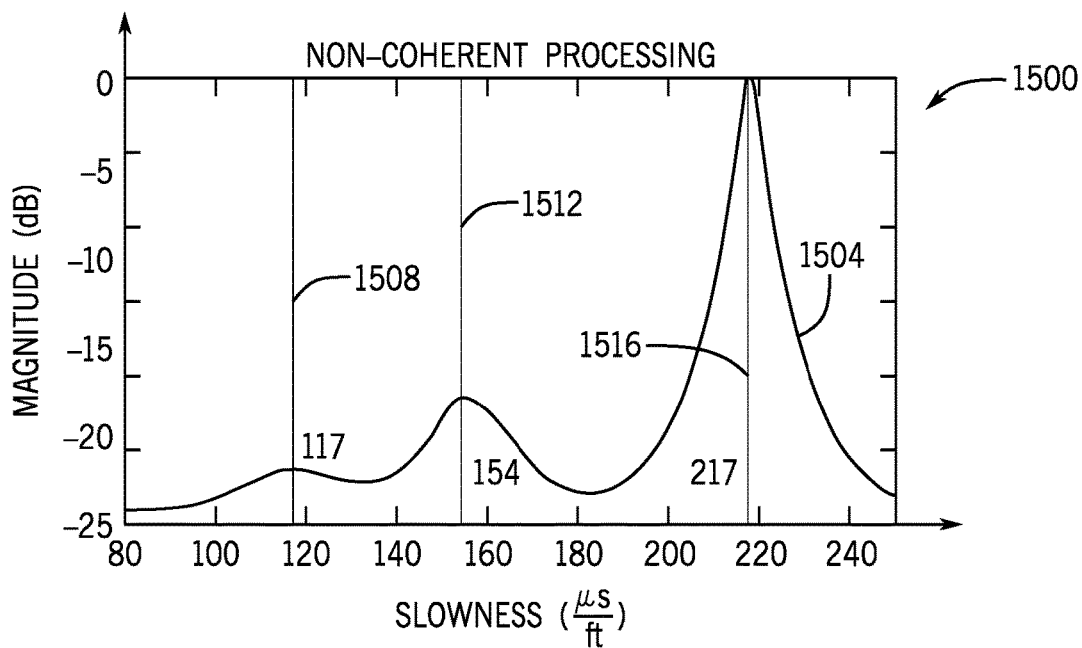
FIG. 15A is an illustration of a Capon spectrum and the use of non-coherent processing to determine a shear slowness associated with a fast shear velocity direction for a horizontal borehole section of a TIV formation according to an example implementation.
Figure 15B:
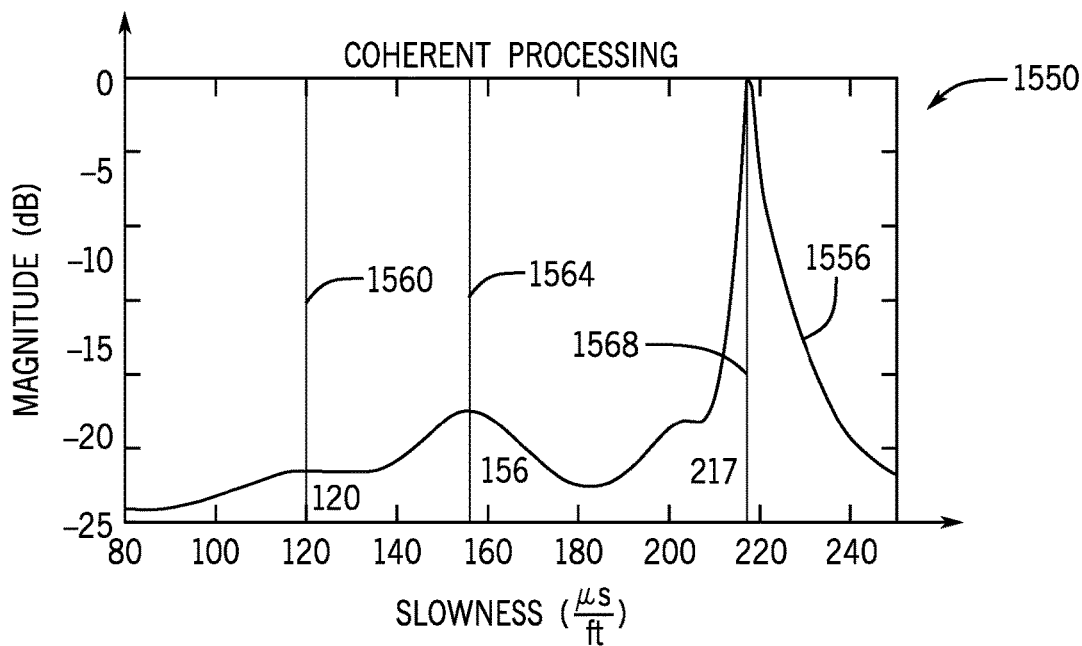
FIG. 15B is an illustration of a Capon spectrum and the use of coherent processing to determine a shear slowness associated with a fast shear velocity direction for a horizontal borehole section of a TIV formation according to an example implementation.

FIGS. 15A and 15B are illustrations 1500 and 1550, respectively, illustrating the determination of fast shear slowness in a horizontal borehole section of a TIV formation. The time domain waveforms 402 are illustrated in FIG. 4. In this manner, FIG. 15A illustrates a Capon spectrum 1504 for the non-coherent processing, illustrating peaks found at slownesses 1508, 1512 and 1504. FIG. 15B illustrates a Capon spectrum 1556 and corresponding peaks identified as slownesses 1560, 1564 and 1556. The frequency range is [12, 17] kHz, and the slowness range is [80, 250] kHz. In this case, the three distinct peaks of the non-coherent processing workflow can be detected at 117 µs/ft, 154 µs/ft and 217 µs/ft, respectively. In comparison, the multi-frequency non-dispersive Capon spectrum (FIG. 15B) also gives three peaks at 120 µs/ft, 156 µs/ft and 217 µs/ft. The true fast shear slowness is 116 µs/ft.

Figure 16A:
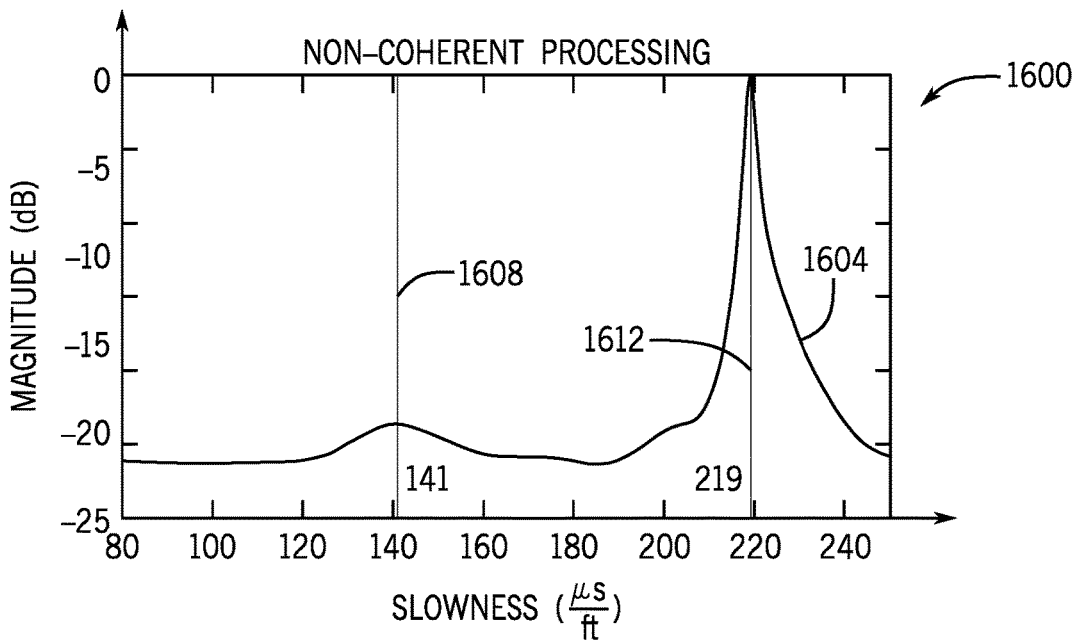
FIG. 16A is an illustration of a Capon spectrum and the use of non-coherent processing to determine a shear slowness associated with a slow shear velocity direction for a horizontal borehole section of a TIV formation according to an example implementation.
Figure 16B:
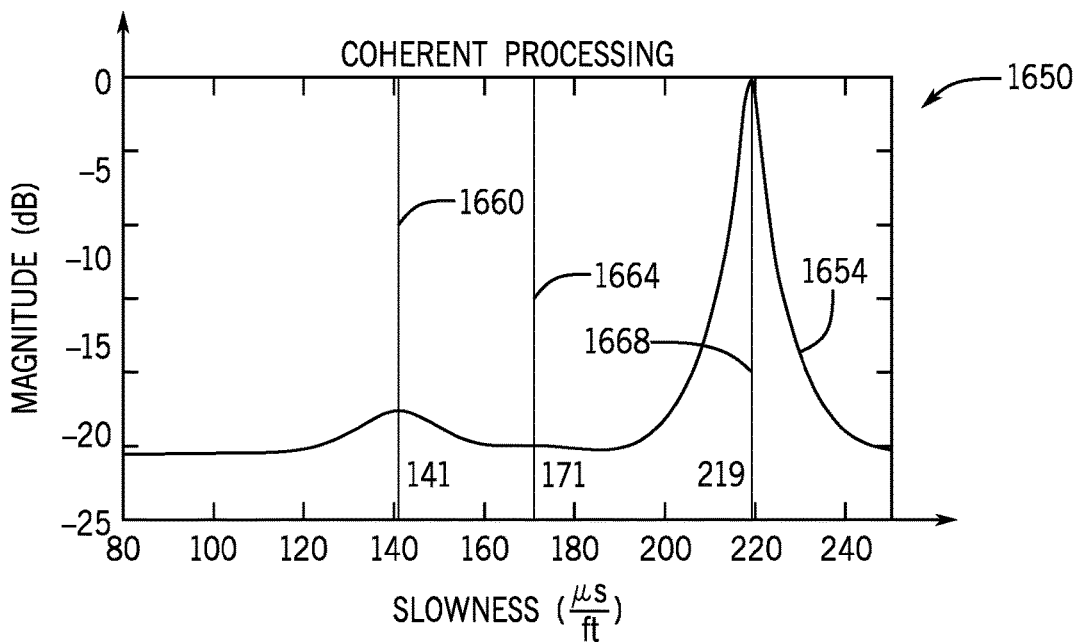
FIG. 16B is an illustration of a Capon spectrum and the use of coherent processing to determine a shear slowness associated with a slow shear velocity direction for a horizontal borehole section of a TIV formation according to an example implementation.

FIGS. 16A and 16B are illustrations 1600 and 1650, respectively, illustrating the determination of slow shear slowness in a horizontal borehole section of a TIV formation. The time domain waveforms 502 are illustrated in FIG. 5A. In this manner, FIG. 16A illustrates a Capon spectrum 1604 for the non-coherent processing. The Capon spectrum 1604 has peaks identified at slownesses of 141 µs/ft (reference numeral 1608) and 219 µs/ft (reference numeral 1612), respectively. FIG. 16B illustrates a Capon spectrum 1654 for the coherent processing. The Capon spectrum 1654 contains peaks at slownesses of 141 µs/ft (reference numeral 1660), 171 µs/ft (reference numeral 1664) and 219 µs/ft (reference numeral 1668), respectively. The selected frequency range is selected as [15, 20] kHz, and the slowness range is [80, 250] kHz. The true fast shear slowness is 140 µs/ft. A comparison of FIGS. 16A and 16B to FIGS. 15A and 15B reveals the tool flexural splitting at the high frequency range for the fast and slow shear waves with a distance of 2 µs/ft.

Figure 17:
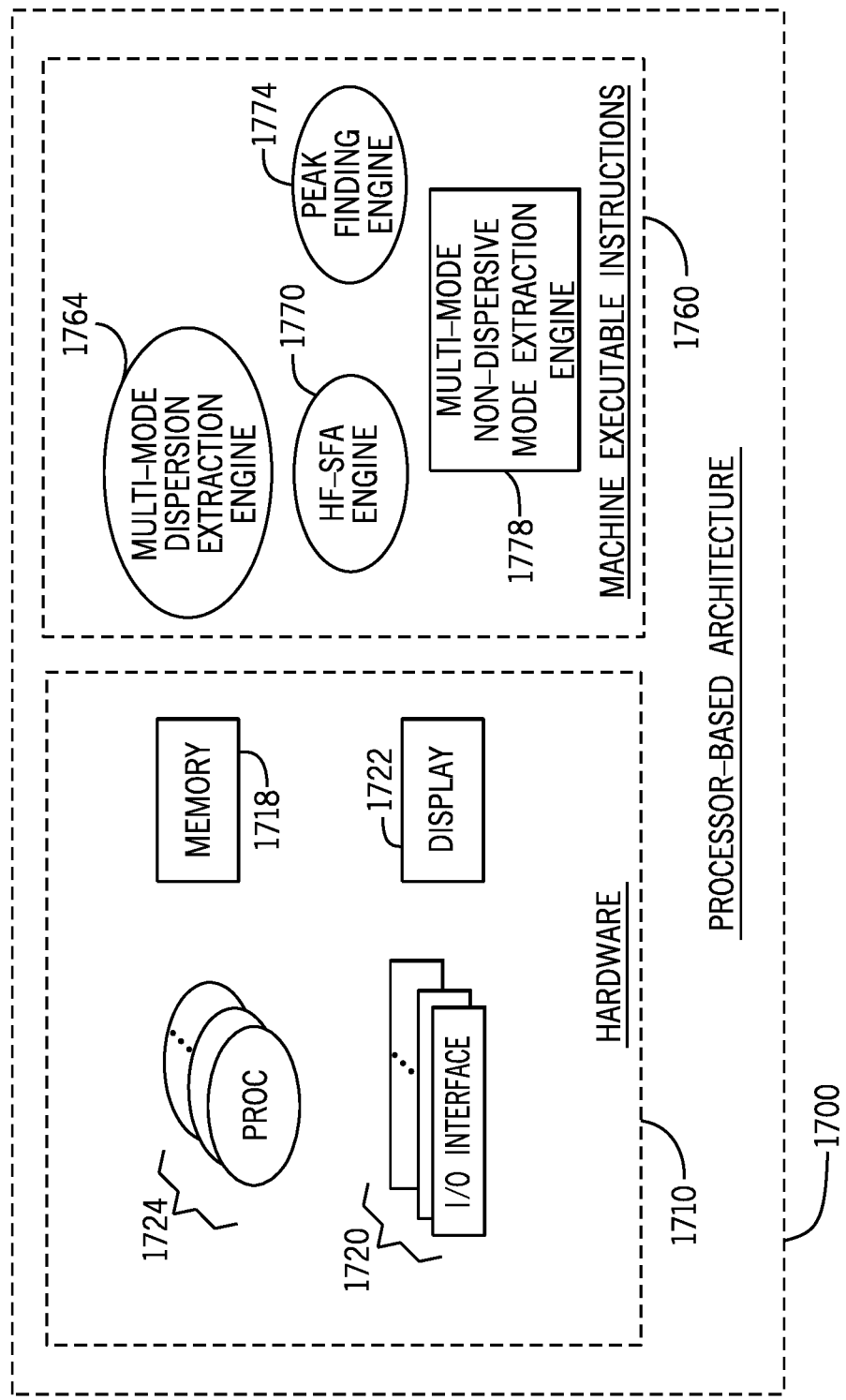
FIG. 17 is a schematic diagram of a processor-based architecture according to an example implementation.

Referring to FIG. 17, in accordance with example implementations, the non-coherent processing system 700 (FIG. 7) and/or incoherent processing system 1000 (FIG. 10) may be implemented on a processor-based architecture 1700. In general, the processor-based architecture 1700 may be formed from one or multiple actual, physical machines that are made up of actual hardware 1710 and machine executable instructions 1760, or "software." The components of the processor-based architecture 1700 may be disposed at the same geographical location or may be disposed at different geographical locations, depending on the particular implementation.

In accordance with example implementations, the processor-based architecture 1700 may be disposed at the Earth surface of a well in which the LWD acoustic measurement tool is deployed; the processor-based architecture 1700 may be disposed downhole in the well with the acoustic measurement tool; the processor-based architecture may be at a remote processing facility with respect to the well; and so forth.

In accordance with some implementations, the hardware 1710 may include one or multiple processors 1724 (one or multiple central processing units (CPUs), one or multiple CPU processing cores, and so forth). The hardware 1710 may further include a memory 1718, which may, for example, contain data representing time domain waveforms acquired by an acoustic measurement tool; parameters and data relating to dispersion extraction; parameters and data relating to coherent and non-coherent processing; and so forth. The memory 1718 may further store executable instructions that, when executed by the processor(s) 1724, cause the processor(s) 1724 to perform some or all of one or more of the techniques that are described herein.

In general, the memory 1718 is a non-transitory memory that may be formed from, as examples, semiconductor storage devices, memristors, magnetic storage devices, phase change memory devices, a combination of one or more of these storage technologies, and so forth, depending on the particular implementation.

In accordance with example implementations, the hardware 1710 of the processor-based architecture 1700 may various other components, such as one or multiple input/output (I/O) communication interfaces 1720, one or multiple well telemetry interfaces, a display 1722, and so forth. In accordance with some implementations, the display 1722 may display results of dispersion extraction, dispersion estimates, shear slowness values, shear slowness estimates, mud slowness estimates, dispersion reconstruction, Capon spectrums, integration results, and so forth.

In accordance with example implementations, the machine executable instructions 1716 may include, for example, instructions that when executed by the processor(s) 1724, cause the processor (s) 1724 to form one or more of the following: instructions 1764 to form the multi-mode dispersion extraction engine 714 (FIG. 7); instructions 1770 to form the HF-SFA engine 722 (FIG. 7); instructions 1774 to form the peak finding engine 730 (FIG. 7); instructions 1778 to form the multi-mode non-dispersive mode extraction engine (FIGS. 10 and 11); instructions to form an operating system; and so forth.

In accordance with further example implementations, all or part of the above-described processor-based architecture may be replaced by dedicated, hardwired circuitry or by an application specific integrated circuit (ASIC). Thus, many implementations are contemplated, which are within the scope of the appended claims.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method comprising:
receiving data acquired by an acoustic measurement tool in a borehole, wherein the data represents multiple acoustic modes including a first order formation flexural acoustic mode and a higher order formation flexural acoustic mode;
processing the data to identify the higher order formation flexural acoustic mode by extracting dispersion energies associated with the multiple acoustic modes wherein an identified portion of the higher order formation flexural acoustic mode is characterized as non-dispersive with respect to frequency;
determining a shear slowness based at least in part on slowness values associated with the identified portion of the higher order formation flexural acoustic mode; and
performing a downhole operation based on the shear slowness.

2. The method of claim 1, wherein:
receiving the data comprises receiving data acquired by the acoustic measurement tool when deployed in a lateral borehole section of a transversely isotropic with vertical axis of symmetry (TIV) formation; and
determining the shear slowness comprises determining a fast shear slowness or a slow shear slowness based at least in part on the identified higher order formation flexural borehole acoustic mode.

3. The method of claim 1, wherein processing the data to identify the higher order formation flexural acoustic mode and determining the shear slowness comprises:
processing the data to determine time domain waveforms; and
applying non-coherent processing to the time domain waveforms.

4. The method of claim 3, wherein applying non-coherent processing comprises:
non-coherently integrating the dispersion energies with respect to frequency.

5. The method of claim 1, wherein extracting the dispersion energies comprises processing the data in the space-time domain.

6. The method of claim 1, wherein extracting the dispersion energies comprises processing the data in the space-frequency domain.

7. The method of claim 6, wherein processing the data in the space-frequency domain comprises processing the data using a single frequency.

8. The method of claim 6, wherein processing the data in the space-frequency domain comprises processing the data based on frequency window comprising multiple frequencies.

9. The method of claim 1, wherein processing the data to identify the higher order formation flexural acoustic mode and determining the shear slowness comprises:
applying coherent processing to the data.

10. The method of claim 9, wherein applying coherent processing comprises:
applying a fast Fourier transform (FFT) to the data;
determining a space-frequency block; and
applying multiple frequency non-dispersive Capon processing to the block.

11. The method of claim 10, wherein applying the multiple frequency non-dispersive Capon processing comprises:

performing wavenumber de-dispersion for non-dispersive modes;
performing spatial smoothing; and
performing multiple frequency non-dispersive integration.

12. An apparatus comprising:
an interface to receive data representing measurements acquired by a logging while drilling (LWD) acoustic measurement tool in a borehole in response to energy emitted by a dipole source of the tool, wherein the data represents multiple acoustic modes including a first order formation flexural acoustic mode and a higher order formation flexural acoustic mode; and
a processor to:
process the data to identify the higher order formation flexural acoustic mode by extraction of dispersion energies associated with the multiple acoustic modes wherein an identified portion of the higher order formation flexural acoustic mode is characterized as non-dispersive with respect to frequency;
determine a shear slowness based at least in part on slowness values associated with the identified portion of the higher order formation flexural acoustic mode; and
perform a downhole operation based on the shear slowness.

13. The apparatus of claim 12, wherein:
the data is acquired by the acoustic measurement tool when deployed in a lateral borehole section of a transversely isotropic with vertical axis of symmetry (TIV) formation; and
the processor determines a fast shear slowness or a slow shear slowness.

14. The apparatus of claim 12, wherein the processor:
processes the data to determine time domain waveforms; and
applies non-coherent processing to the time domain waveforms to determine the shear slowness.

15. The apparatus of claim 12, wherein the processor:
applies coherent processing to the data to determine the shear slowness.

16. An article comprising a non-transitory computer readable storage medium to store instructions that when executed by a computer cause the computer to:
receive data acquired by an acoustic measurement tool in a borehole, wherein the data represents multiple acoustic modes including a first order formation flexural acoustic mode and a higher order formation flexural acoustic mode;
process the data to identify the higher order formation flexural acoustic mode by extraction of dispersion energies associated with the multiple acoustic modes wherein an identified portion of the higher order formation flexural acoustic mode is characterized as non-dispersive with respect to frequency;
determine a shear slowness based at least in part on slowness values associated with the identified portion of the higher order formation flexural acoustic mode; and
perform a downhole operation based on the shear slowness.

17. The article of claim 16, the storage medium storing instructions that when executed by the computer cause the computer to identify a non-dispersive frequency range of the higher order formation flexural acoustic mode.

18. The article of claim 16, the storage medium storing instructions that when executed by the computer cause the computer to:
apply slowness frequency analysis (SFA) to a result of the extraction of dispersion energies in a selected frequency range to determine the shear slowness.

19. The article of claim 16, the storage medium storing instructions that when executed by the computer cause the computer to:
perform a fast Fourier transform (FFT) of the data;
determine a space-frequency block of a result of the FFT;
process the block to remove acoustic mode dispersion in a wavenumber-frequency domain;
spatially smooth a result of processing the block to remove acoustic mode dispersion;
determine an inverse of an integrated energy of a signal resulting from the spatial smoothing to derive a Capon spectrum; and
determine the shear slowness based at least in part on identification of a peak in the Capon spectrum.

* * * * *